United States Patent
Sakai et al.

(10) Patent No.: US 10,146,228 B2
(45) Date of Patent: Dec. 4, 2018

(54) WORK VEHICLE CONTROL SYSTEM

(71) Applicant: Komatsu Ltd., Tokyo (JP)

(72) Inventors: Atsushi Sakai, Chigasaki (JP); Tatsuya Shiga, Chigasaki (JP); Ryuuen Kou, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 15/311,226

(22) PCT Filed: Mar. 31, 2016

(86) PCT No.: PCT/JP2016/060848
§ 371 (c)(1),
(2) Date: Nov. 15, 2016

(87) PCT Pub. No.: WO2016/111386
PCT Pub. Date: Jul. 14, 2016

(65) Prior Publication Data
US 2017/0285658 A1    Oct. 5, 2017

(51) Int. Cl.
*G05D 1/02* (2006.01)
*G01C 21/12* (2006.01)
*G01C 21/26* (2006.01)
*G01S 19/14* (2010.01)
*B60T 7/00* (2006.01)
(Continued)

(52) U.S. Cl.
CPC ............. *G05D 1/0278* (2013.01); *B60T 7/00* (2013.01); *B60T 7/18* (2013.01); *B60T 7/22* (2013.01);
(Continued)

(58) Field of Classification Search
CPC ...... G05D 1/0278; G01C 21/12; G01C 21/26; G01S 19/14; B60Y 2200/41
See application file for complete search history.

(56) References Cited

U.S. PATENT DOCUMENTS 6,292,725 B1 * 9/2001 Kageyama ............. G05D 1/027
180/169
2012/0053831 A1    3/2012 Halder
(Continued)

FOREIGN PATENT DOCUMENTS

AU    2013337237 A1    2/2015
JP    09-128043 A    5/1997
(Continued)

OTHER PUBLICATIONS

Office Action dated Jan. 11, 2017, issued in the corresponding Australian patent application No. 2016205662.
(Continued)

*Primary Examiner* — Aaron L Troost
(74) *Attorney, Agent, or Firm* — Locke Lord LLP

(57) ABSTRACT

A work vehicle control system controls a work vehicle having a braking device. The work vehicle control system includes a location information generating unit that obtains and outputs a location of the work vehicle, and a control unit that controls the braking device based on location information of the work vehicle obtained from the location information generating unit. The control unit determines braking force that controls the braking device based on first accuracy that is accuracy of the location information of the work vehicle obtained from the location information generating unit.

15 Claims, 13 Drawing Sheets

(51) Int. Cl.
  *B60T 7/18* (2006.01)
  *B60T 7/22* (2006.01)
  *G01C 21/16* (2006.01)

(52) U.S. Cl.
  CPC ............ *G01C 21/12* (2013.01); *G01C 21/26* (2013.01); *G01S 19/14* (2013.01); *B60T 2201/02* (2013.01); *B60T 2201/022* (2013.01); *B60T 2210/36* (2013.01); *B60Y 2200/41* (2013.01); *G01C 21/165* (2013.01)

(56) References Cited

U.S. PATENT DOCUMENTS

| | | | |
|---|---|---|---|
| 2012/0299702 A1* | 11/2012 | Edara | G01S 19/49 340/8.1 |
| 2014/0019042 A1* | 1/2014 | Sugawara | E02F 9/26 701/431 |
| 2015/0134147 A1 | 5/2015 | Woo et al. | |

FOREIGN PATENT DOCUMENTS

| JP | 2002-351541 A | 12/2002 |
|---|---|---|
| JP | 2005-215742 A | 8/2005 |
| JP | 2012-148699 A | 8/2012 |
| JP | 2015-036840 A | 2/2015 |

OTHER PUBLICATIONS

International Search Report dated May 10, 2016, issued for PCT/JP2016/060848.

\* cited by examiner

| | PSTH | PSTM | PSTL |
|---|---|---|---|
| PPL | G11 | G12 | G13 |
| PPM | G21 | G22 | G23 |
| PPH | G31 | G32 | G33 |

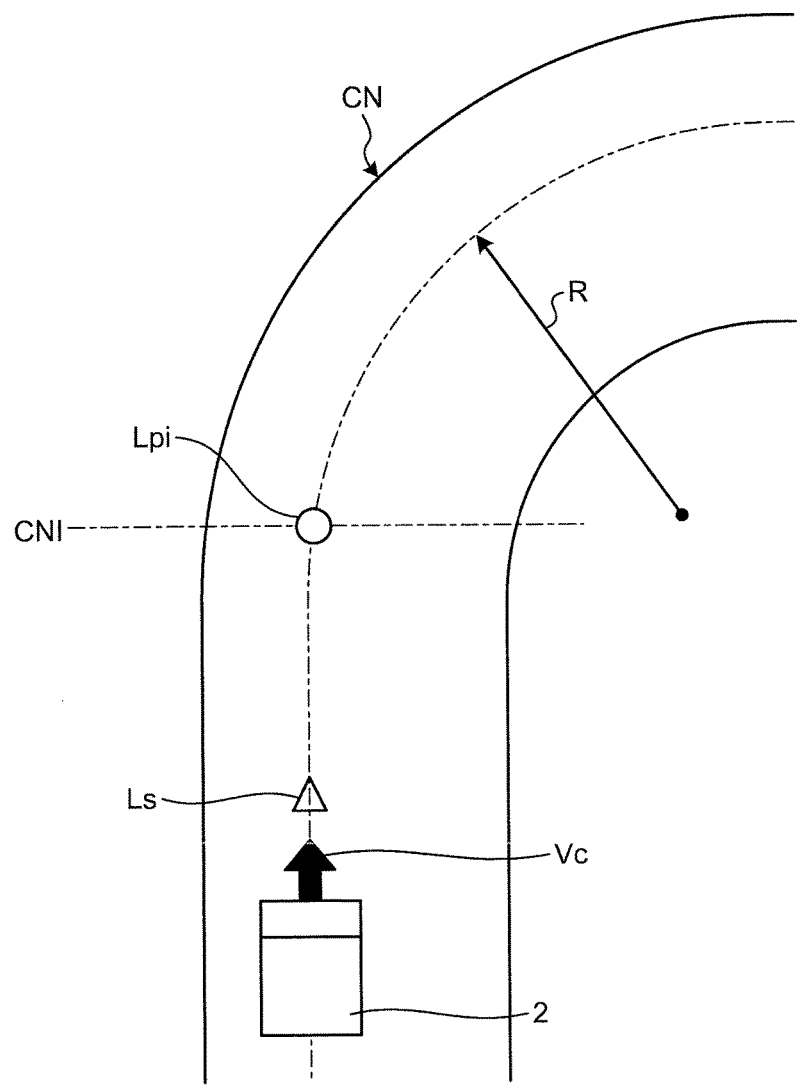

WORK VEHICLE CONTROL SYSTEM

FIELD

The present invention relates to a work vehicle control system in which a braking device is controlled using location information.

BACKGROUND

Some of work vehicles such as a dump truck, a wheel loader, and a grader are configured such that various types of control are performed using a location of the own device obtained by means of a positioning satellite, a location of the own vehicle obtained by means of a mark such as a landmark, or a location of the own vehicle obtained by means of dead reckoning navigation or the like. Patent Literature 1 describes a technique for evaluating reliability of a location measurement system by a distance measurement sensor, and adjusting a control parameter based on a result of the evaluation.

CITATION LIST

Patent Literature

Patent Literature 1: Unexamined Japanese patent application No. 2015-036840

SUMMARY

Technical Problem

A work vehicle sometimes stops at a target location or reduces its velocity to a target velocity at the target location. In this case, a braking device of the work vehicle operates to stop the work vehicle or reduce the velocity of the work vehicle. In a case where the work vehicle is stopped at the target location, the work vehicle can stop with good accuracy when large braking force is exhibited in the vicinity of the target location. However, an impact that occurs on the work vehicle is also increased.

An object of the present invention is to suppress, upon braking the work vehicle so that the work vehicle has the target velocity at the target location, the reduction in the accuracy that is required for the location of the work vehicle that has reached the target location while suppressing the impact that occurs on the work vehicle.

Solution to Problem

According to a first aspect of the present invention, a work vehicle control system that controls a work vehicle having a braking device, the work vehicle control system comprises: a location information generating unit that obtains and outputs a location of the work vehicle; and a control unit that controls the braking device based on location information of the work vehicle obtained from the location information generating unit, wherein the control unit determines braking force that controls the braking device based on first accuracy that is accuracy of the location information of the work vehicle obtained from the location information generating unit.

According to a second aspect of the present invention, in the work vehicle control system according to the aspect 1, wherein the location information generating unit has at least a GNSS location information generating unit and a scan matching navigation location information generating unit, and the first accuracy of the location information of the work vehicle obtained from the GNSS location information generating unit is higher than the first accuracy of the location information of the work vehicle obtained from the scan matching navigation location information generating unit.

According to a third aspect of the present invention, in the work vehicle control system according to the aspect 1, wherein the location information generating unit has at least a GNSS location information generating unit and a dead reckoning navigation location information generating unit, and the first accuracy of the location information of the work vehicle obtained from the GNSS location information generating unit is higher than the first accuracy of the location information of the work vehicle obtained from the dead reckoning navigation location information generating unit.

According to a fourth aspect of the present invention, in the work vehicle control system according to the aspect 1, wherein the location information generating unit has at least a scan matching navigation location information generating unit and a dead reckoning navigation location information generating unit, and the first accuracy of the location information of the work vehicle obtained from the scan matching navigation location information generating unit is higher than the first accuracy of the location information of the work vehicle obtained from the dead reckoning navigation location information generating unit.

According to a fifth aspect of the present invention, in the work vehicle control system according to any one of the aspects 1 to 4, wherein the control unit determines the braking force such that an impact that occurs on the work vehicle is reduced as the first accuracy becomes high.

According to a sixth aspect of the present invention, in the work vehicle control system according to the aspect 5, wherein the control unit controls the braking device using first control that causes the braking device to generate the braking force and second control that is executed after the first control and has the braking force equal to or larger than the braking force of the first control, and the control unit determines the braking force such that the braking force at a time of the first control is increased as the first accuracy becomes high.

According to a seventh aspect of the present invention, in the work vehicle control system according to the aspect 5, wherein the control unit controls the braking device using only first control that causes the braking device to generate the braking force, and the control unit determines the braking force such that the braking force is reduced as the first accuracy becomes high.

According to an eighth aspect of the present invention, in the work vehicle control system according to any one of the aspects 1 to 4, wherein the braking force that controls the braking device is determined by second accuracy that is location accuracy required when the work vehicle stops at a target stop location.

According to a ninth aspect of the present invention, a work vehicle control system that controls a work vehicle having a braking device, the work vehicle control system comprises: a location information generating unit that obtains and outputs a location of the work vehicle; and a control unit that controls the braking device based on location information of the work vehicle obtained from the location information generating unit, wherein the control unit determines braking force that controls the braking device by using second accuracy that is location accuracy required when the work vehicle stops at a target stop location.

According to a tenth aspect of the present invention, in the work vehicle control system according to the aspect 9, wherein the stop location has at least a discharging location for a crusher and a stop location on a haul lane, and the second accuracy at the discharging location for the crusher is higher than the second accuracy at the stop location on the haul lane.

According to a eleventh aspect of the present invention, in the work vehicle control system according to the aspect 9, wherein the stop location has at least a discharging location for a cliff bottom and a stop location on a haul lane, and the second accuracy at the discharging location for the cliff bottom is higher than the second accuracy at the stop location on the haul lane.

According to a twelfth aspect of the present invention, in the work vehicle control system according to the aspect 9, wherein the stop location has at least a loading location and a stop location on a haul lane, and the second accuracy at the loading location is higher than the second accuracy at the stop location on the haul lane.

According to a thirteenth aspect of the present invention, in the work vehicle control system according to any one of the aspects 9 to 12, wherein the control unit determines the braking force such that an impact that occurs on the work vehicle is reduced as the second accuracy becomes low.

According to a fourteenth aspect of the present invention, in the work vehicle control system according to the aspect 13, wherein the control unit controls the braking device using first control that causes the braking device to generate the braking force and second control that is executed after the first control and has the braking force equal to or larger than the braking force of the first control, and the control unit determines the braking force such that the braking force at a time of the first control is increased as the second accuracy becomes low.

According to a fifteenth aspect of the present invention, in the work vehicle control system according to the aspect 13, wherein the control unit controls the braking device using only first control that causes the braking device to generate the braking force, and the control unit determines the braking force such that the braking force is reduced as the second accuracy becomes low.

The present invention can suppress, upon braking a work vehicle so that the work vehicle has a target velocity at a target location, a reduction in an accuracy that is required for a location of the work vehicle that has reached the target location while suppressing an impact that occurs on the work vehicle.

BRIEF DESCRIPTION OF DRAWINGS

FIG. 19 is a diagram illustrating the dump truck that enters a curve.

FIG. 20 is a diagram illustrating an exemplary data table in which the braking force gains are described.

DESCRIPTION OF EMBODIMENTS

Embodiments for practicing the present invention (embodiments) will be described in detail with reference to the drawings.

First Embodiment

Figure 1:
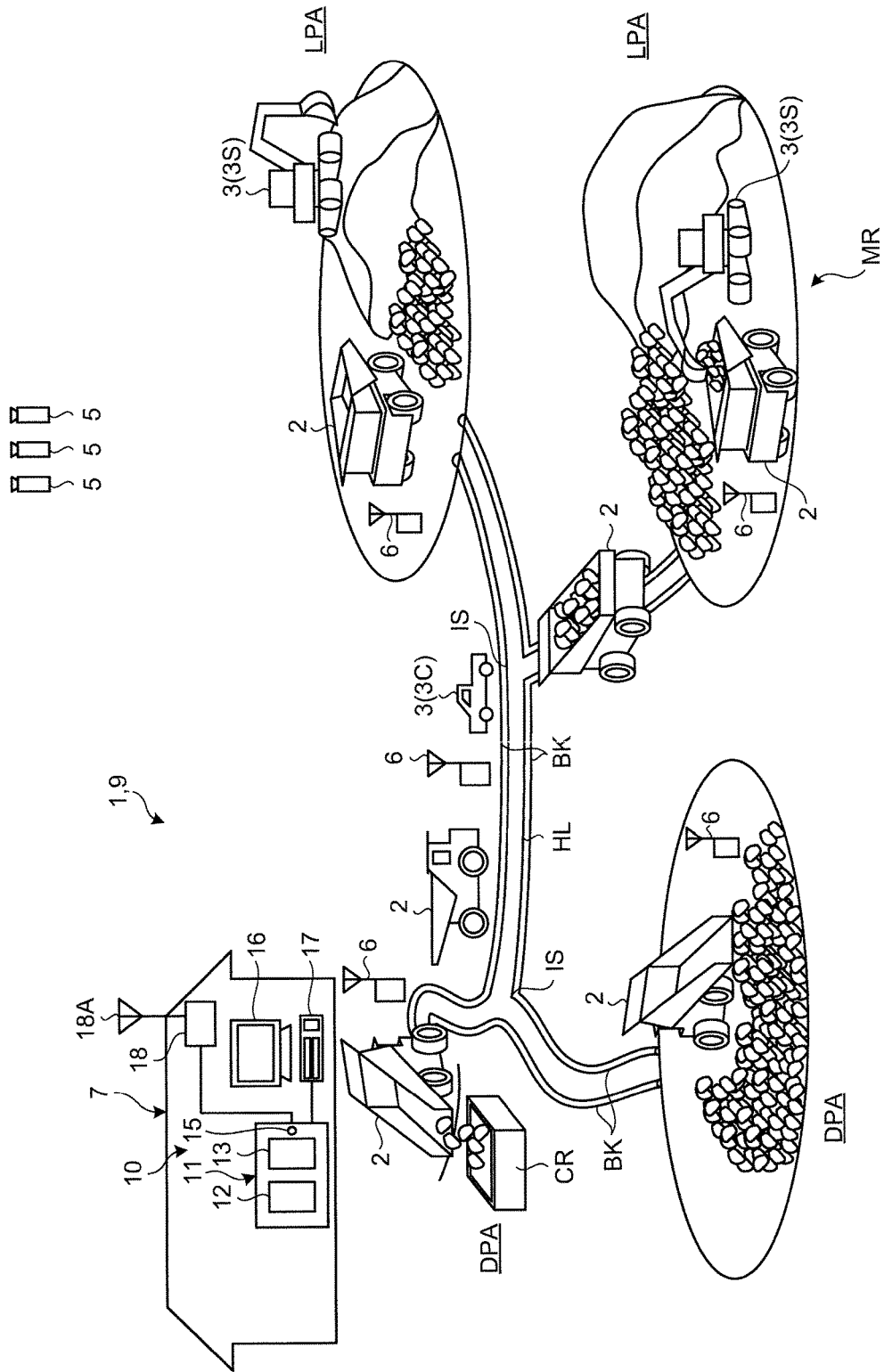
FIG. 1 is a diagram illustrating an exemplary site in which a work vehicle according to a first embodiment is used.

FIG. 1 is a diagram illustrating an exemplary site in which a work vehicle according to a first embodiment is used. In the present embodiment, the work vehicle is a mining machine that is used in a mine MR. In the present embodiment, the mining machine is managed by a management system 1. The management of the mining machine includes at least one of operation management of the mining machine, evaluation of productivity of the mining machine, evaluation of a manipulation technique of an operator that manipulates the mining machine, maintenance of the mining machine, and malfunction diagnosis for the mining machine.

The mining machine is a general term for machinery that is used for various types of work in the mine MR. The mining machine includes at least one of a boring machine, an excavating machine, a loading machine, a transporting machine, a crusher, and a vehicle driven by a worker. The excavating machine is a machine that excavates the mine MR. The loading machine is a machine that loads a burden onto the transporting machine. The loading machine includes at least one of an excavator, an electric excavator, and a wheel loader. The transporting machine is a machine that moves within the mine MR to transport the burden. The transporting machine includes a dump truck. The burden includes at least one of soil and ore generated when the mine MR is mined.

The mine MR has at least a part of a loading place LPA, a discharging place DPA, a haul lane HL leading to at least one of the loading place LPA and the discharging place DPA, and an intersection IS at which the haul lanes HL intersect. A crusher CR that crushes discharged soil may be arranged in at least one discharging place DPA. The mine MR has a bank BK formed by a pile of soil in the vicinity of the haul lane HL. The bank BK may further be provided on at least one of the outside of the loading place LPA and the outside of the discharging place DPA.

A dump truck 2 moves within the mine MR to haul the burden. The dump truck 2 runs on at least a part of the haul lane HL and the intersection IS of the mine MR to move between the loading place LPA and the discharging place DPA. The dump truck 2 is loaded with the burden in the loading place LPA. The loading place LPA is a region (place) in the mine MR where loading work for the burden is performed. In the loading place LPA, the loading machine that is another mining machine other than the dump truck 2 loads the burden onto the dump truck 2.

The burden is unloaded (discharged) from the dump truck 2 in the discharging place DPA. The discharging place DPA is a region (place) in the mine MR where discharging work for the burden is performed. In the discharging place DPA where the crusher CR is provided, the dump truck 2 puts the discharged soil, namely, the burden, into the crusher CR.

In the present embodiment, the dump truck 2 is a so-called unmanned dump truck that autonomously runs on a running path in accordance with a command from a management device 10. When the dump truck 2 autonomously runs, manipulation of the operator (driver) is not required. The phrase "the dump truck 2 autonomously runs" means that the dump truck 2 does not run in accordance with the manipulation of the operator, but runs in accordance with the command from the management device 10. In the present embodiment, the dump truck 2 can also run in accordance with the manipulation of the operator.

The management system 1 includes the management device 10 and a communication system 9. The management device 10 manages the mining machine that operates in the mine MR. The communication system 9 transmits information. The management device 10 is provided in a control facility 7 of the mine MR. The communication system 9 transmits the information, using wireless communication, between the management device 10, the dump truck 2, and another mining machine 3 (e.g., a loading machine 3S such as an excavator, and a vehicle 3C). The management device 10, the dump truck 2, and the other mining machine 3 can bi-directionally and wirelessly communicate with one another via the communication system 9. In the present embodiment, the communication system 9 has a plurality of repeaters 6 that relays a signal (radio wave) between the management device 10, the dump truck 2, and the other mining machine 3.

In the present embodiment, a location of the dump truck 2 and a location of the other mining machine 3 are detected by using a global navigation satellite system (GNSS). An example of the global navigation satellite system includes, but is not limited to, a GPS. The GNSS has a plurality of positioning satellites 5. The GNSS detects a location in a coordinate system that defines latitude, longitude, and height. The coordinate system of the GNSS is also referred to as a global coordinate system in the present embodiment. The location detected by the GNSS includes coordinate data of latitude, longitude, and height.

The location of the dump truck 2 and the location of the other mining machine 3 in the mine MR are detected by the GNSS. The location detected by the GNSS is an absolute location defined in the global coordinate system. In the following description, the location detected by the GNSS is appropriately referred to as a GPS location. The GPS location is the absolute location and the coordinate data (coordinate value) of latitude, longitude, and height. In the GNSS, a positioning state is changed by the influence of the arrangement of the positioning satellites 5, the ionosphere, the troposphere, or a landform around an antenna that receives information from the positioning satellite 5. This positioning state includes, for example, a fixed solution (accuracy: about ±1 cm to 2 cm), a float solution (accuracy: about ±10 cm to several meters), a single solution (accuracy: about ±several meters), and non-positioning (positioning calculation disability) or the like.

The management device 10 arranged in the control facility 7 includes, as illustrated in FIG. 1, a computer 11, a display device 16, an input device 17, and a wireless communication device 18. The computer 11 includes a processing device 12, a storage device 13, and an input/output unit 15. The display device 16, the input device 17, and the wireless communication device 18 are coupled to the computer 11 via the input/output unit 15. The input/output unit 15 is used for inputting/outputting information to/from at least one of the processing device 12, the display device 16, the input device 17, and the wireless communication device 18.

Figure 2:
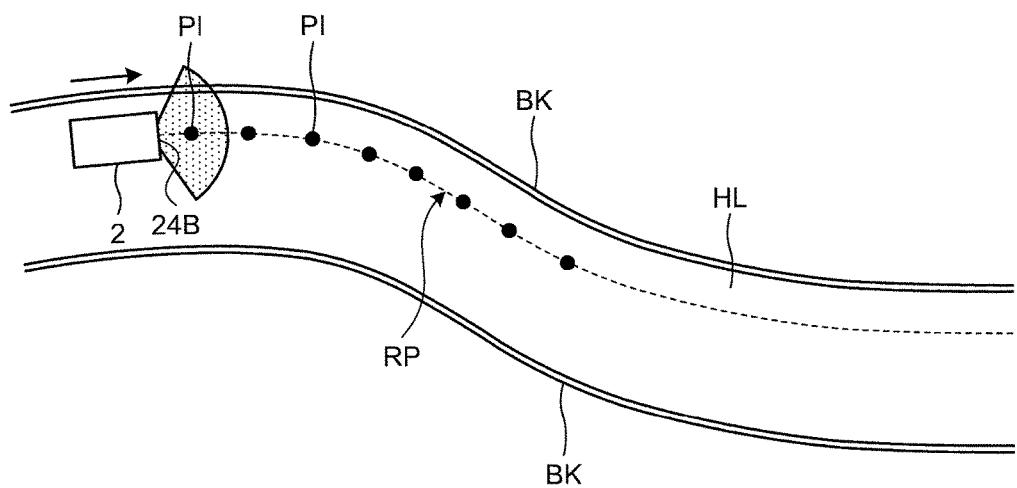
FIG. 2 is a schematic diagram illustrating a dump truck that runs on a haul lane.

FIG. 2 is a schematic diagram illustrating the dump truck 2 that runs on the haul lane HL. The processing device 12 executes various types of processes related to the management of the dump truck 2 and various types of processes related to the management of the other mining machine 3. When the dump truck 2 autonomously runs in the mine MR, the processing device 12 generates a running path RP on which the dump truck 2 runs. The running path RP is an aggregate of a plurality of points PI. In other words, a track that passes through the plurality of points PI is the running path RP. For each of the points PI, the absolute location (coordinate data of latitude, longitude, and height) is defined. The point PI constituting the running path RP includes at least absolute location information and velocity information. The velocity information is a target velocity of the dump truck that runs at the spot. Hereinafter, the absolute location information and the velocity information related to the running path are collectively referred to as running path information. The dump truck 2 that has received the running path information from the processing device 12 runs along the running path RP including at least a part of the loading place LPA, the discharging place DPA, the haul lane HL, and the intersection IS.

The storage device 13 is connected to the processing device 12 and stores various types of information related to the management of the dump truck 2 and the other mining machine 3. The storage device 13 stores a computer program for causing the processing device 12 to execute the various types of processes. The processing device 12 uses the computer program stored in the storage device 13 to process information related to a location and generate the running path RP.

The display device 16 can display a map including the haul lane HL or the like in the mine MR, information related to the location of the dump truck 2, and information related to the location of the other mining machine 3. The input device 17 includes at least one of a keyboard, a touch panel, and a mouse, and functions as a manipulation unit that is capable of inputting a manipulation signal to the processing device 12. An administrator of the control facility 7 manipulates the input device 17 to input a command to the processing device 12.

The wireless communication device 18 has an antenna 18A and is arranged in the control facility 7. The wireless communication device 18 is coupled to the processing device 12 via the input/output unit 15. The wireless communication device 18 is a part of the communication system 9. The wireless communication device 18 can receive information sent from at least one of the dump truck 2 and the other mining machine 3. The information received at the wireless communication device 18 is output to the processing device 12. The information received at the wireless communication device 18 is stored (registered) in the storage device 13. The wireless communication device 18 can send the information to at least one of the dump truck 2 and the other mining machine 3. Next, the dump truck 2 will be described in detail.

<Dump Truck 2>

Figure 3:
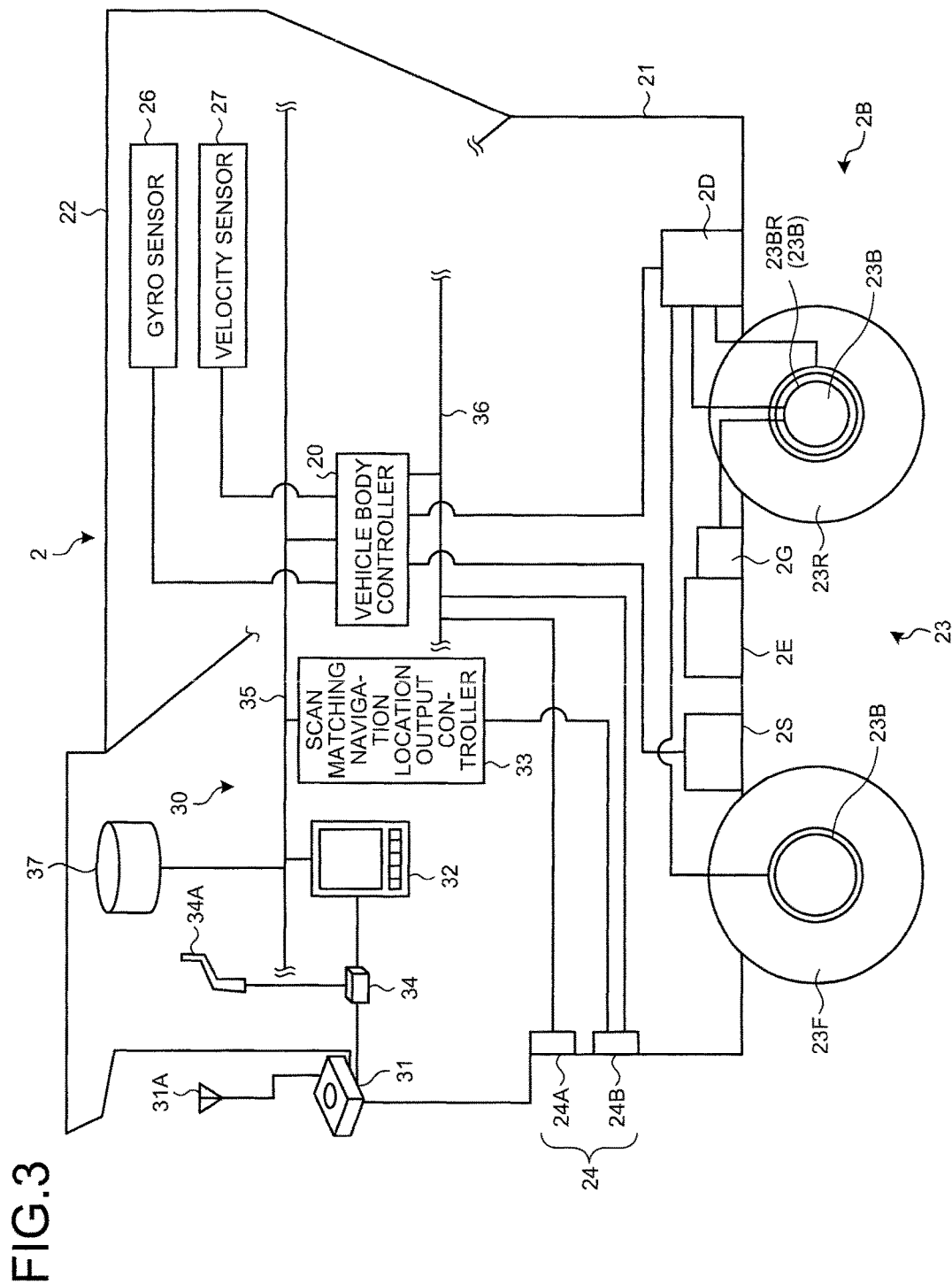
FIG. 3 is a diagram illustrating the dump truck provided with a work vehicle control system according to the first embodiment.

FIG. 3 is a diagram illustrating the dump truck 2 provided with a work vehicle control system 30 according to the first embodiment. In the present embodiment, although an example in which the dump truck 2 is provided with the work vehicle control system 30 will be described, the work vehicle control system 30 may be provided in the other mining machine 3 that is the work vehicle other than the dump truck 2. Hereinafter, the work vehicle control system 30 is appropriately referred to as the control system 30.

The dump truck 2 includes a vehicle body 21, a vessel 22, a running device 23, and an obstacle sensor 24. The vessel 22 and the running device 23 are attached to the vehicle body 21. A drive device 2D for driving the running device 23 is attached to the vehicle body 21. The drive device 2D includes an internal combustion engine 2E such as a diesel engine, a generator 2G, and an electric motor 23M. The generator 2G is driven by the internal combustion engine 2E to generate electric power. The electric motor 23M is driven by the electric power generated by the generator 2G.

The running device 23 includes a front wheel 23F, a rear wheel 23R, a braking device 23B, and a steering device 2S. The front wheel 23F is steered by the steering device 2S. The front wheel 23F functions as a steering wheel of the dump truck 2. The rear wheel 23R is driven by the electric motor 23M arranged within the wheel, and functions as a drive wheel of the dump truck 2. The drive device 2D of the dump truck 2 may transmit power of the internal combustion engine 2E to the rear wheel 23R via a transmission including a torque converter to drive the rear wheel 23R.

The vessel 22 is a carrier onto which the burden is loaded. The vessel 22 is loaded with the burden by the loading machine. In the discharging work, the vessel 22 is raised to discharge the burden.

The obstacle sensor 24 is arranged on a lower part of a front side of the vehicle body 21. The obstacle sensor 24 detects, in a non-contact manner, an obstacle in front of the vehicle body 21. In the present embodiment, the obstacle sensor 24 that is a non-contact sensor includes a radar 24A and a laser sensor 24B.

The laser sensor 24B is a device that detects a location of an object that exists around the dump truck 2. The laser sensor 24B radiates a laser beam in a range, for example, illustrated in FIG. 2, and receives the laser beam reflected by the object. In this manner, the laser sensor 24B detects a direction and a distance of the object with respect to the laser sensor 24B. The object around the dump truck 2 includes an object that exists in the vicinity of the running path RP (e.g., the bank BK, a side wall, an embankment, a tree, and a building). The object that exists in the vicinity of the running path RP may be an artificially manufactured structure. Next, the control system 30 will be described.

The control system 30 includes a scan matching navigation location output controller 33 and a vehicle body controller 20. The scan matching navigation location output controller 33 is a location output device, and the vehicle body controller 20 is a control unit. In addition to this, the control system 30 includes the non-contact sensor 24, a gyro sensor 26, a velocity sensor 27, a GPS receiver 31 that is a positioning device, a running path producing device 32, a wireless communication device 34, a first signal line 35, and a second signal line 36. As illustrated in FIG. 3, the vehicle body controller 20, the running path producing device 32, and the scan matching navigation location output controller 33 are connected to the first signal line 35. They communicate with one another via the first signal line 35 to exchange information.

The vehicle body controller 20 that is the control unit receives the location of the dump truck 2 output from at least one of the scan matching navigation location output controller 33 and the GPS receiver 31. The vehicle body controller 20 then generates and outputs an instruction to control the dump truck 2 based on the received location of the dump truck 2 and the running path information received from the running path producing device 32 which will be described later. The vehicle body controller 20 also generates and outputs an instruction to control a braking device 2B of the dump truck 2 using the received location of the dump truck 2.

Figure 4:
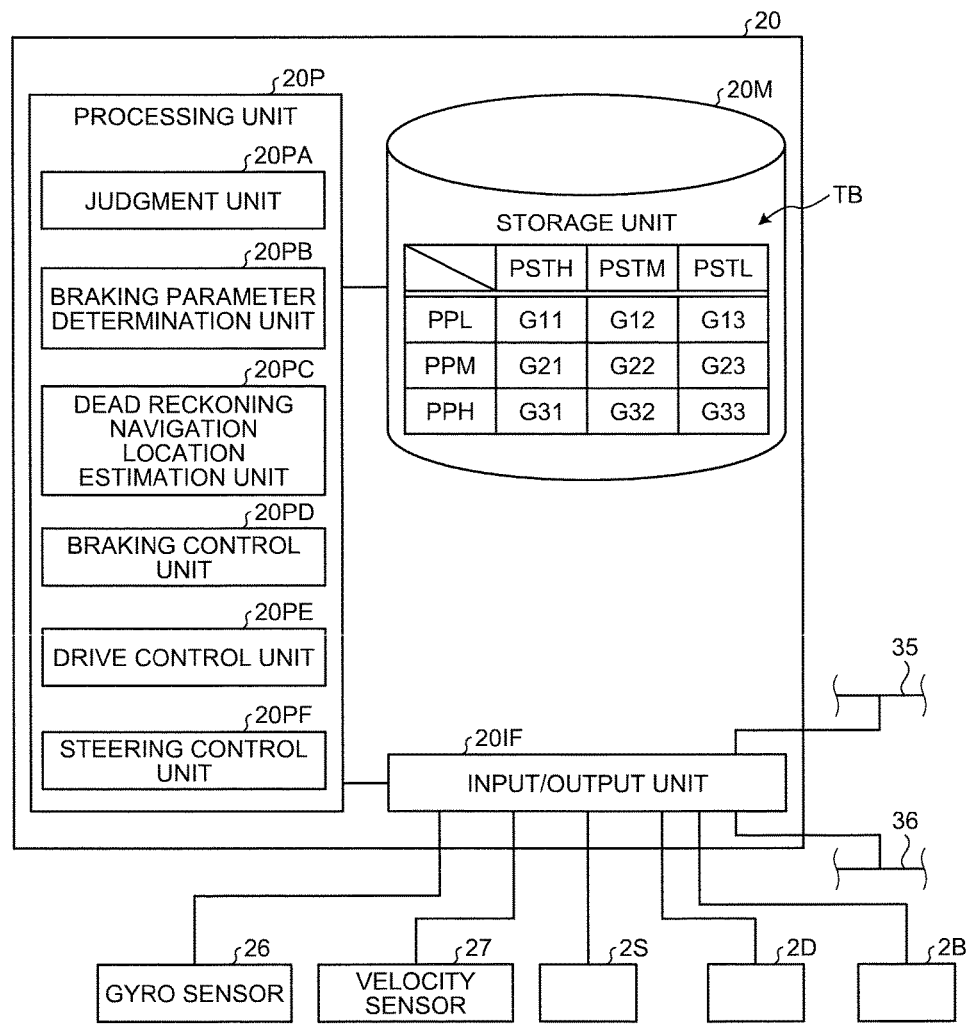
FIG. 4 is a diagram illustrating a vehicle body controller according to the first embodiment.

FIG. 4 is a diagram illustrating the vehicle body controller 20 according to the first embodiment. The vehicle body controller 20 has a processing unit 20P, a storage unit 20M, and an input/output unit 20IF. The processing unit 20P includes a judgment unit 20PA, a braking parameter determination unit 20PB, a dead reckoning navigation location estimation unit 20PC, a braking control unit 20PD, a drive control unit 20PE, and a steering control unit 20PF.

The judgment unit 20PA judges whether to brake the dump truck 2, that is, whether the vehicle body controller 20 causes the braking device 2B to operate. When the vehicle body controller 20 causes the braking device 2B to operate, the braking parameter determination unit 20PB determines control information for controlling the braking device 2B. The dead reckoning navigation location estimation unit 20PC calculates the location of the dump truck 2 using a method of dead reckoning navigation which will be described later. Specifically, the location of the dump truck 2 is estimated using an angular velocity of the dump truck 2 from the gyro sensor 26 and a velocity of the dump truck 2 from the velocity sensor 27. Since the dead reckoning navigation location estimation unit 20PC estimates the location of the own dump truck 2 by means of the dead reckoning navigation, the dead reckoning navigation location estimation unit 20PC is one of a plurality of location information generating units held by the dump truck 2 in the present embodiment. The location information generating units obtain and output the location of the dump truck 2. Information output by the location information generating units is location information of the dump truck 2.

The braking control unit 20PD generates an instruction for controlling the braking device 2B based on the location of the dump truck 2, the running path information received from the running path generating device 32, and the control information determined by the braking parameter determination unit 20PB. The braking control unit 20PD then outputs the instruction to the braking device 2B.

The drive control unit 20PE generates a drive instruction based on the location of the dump truck 2 and the running path information received from the running path generating device 32. The drive control unit 20PE then outputs the drive instruction to the drive device 2D. The steering control unit 20PF generates an instruction for controlling the steering device 2S based on the location of the dump truck 2 and the running path information received from the running path generating device 32. The steering control unit 20PF then outputs the instruction to the steering device 2S. At this time, the braking control unit 20PD, the drive control unit 20PE, and the steering control unit 20PF receive the location, namely, the location information of the dump truck 2 from at least one of the scan matching navigation location output controller 33, the GPS receiver 31, and the dead reckoning navigation location estimation unit 20PC, and receive the running path information from the running path producing device 32.

The storage unit 20M stores a computer program for causing the dump truck 2 to autonomously run, a computer program for controlling the operation of the dump truck 2, and a data table TB in which information that is used for a method of controlling the work vehicle according to the present embodiment is described. The gyro sensor 26, the velocity sensor 27, the steering device 2S, the drive device 2D, the first signal line 35, and the second signal line 36 are connected to the input/output unit 20IF. The input/output unit 20IF is an interface between the vehicle body controller 20 and instruments connected to the vehicle body controller 20.

In the present embodiment, the braking control unit 20PD, the drive control unit 20PE, and the steering control unit 20PF held by the vehicle body controller 20 cause the dump truck 2 to autonomously run using the obtained location of the dump truck 2 and the obtained running path information. Specifically, the vehicle body controller 20 controls at least one of accelerating, steering, and braking of the dump truck 2 so that the location of the dump truck 2 received from at least one of the scan matching navigation location output controller 33, the GPS receiver 31, and the dead reckoning navigation location estimation unit 20PC coincides with the location of the running path RP included in the running path information. Owing to this control, the vehicle body controller 20 causes the dump truck 2 to run along the running path RP.

The running path producing device 32 obtains the running path information generated by the processing device 12 of the management device 10 illustrated in FIG. 1, and outputs the running path information to the vehicle body controller 20. The running path producing device 32 is connected to the wireless communication device 34 to which an antenna 34A is connected. The wireless communication device 34 receives information sent from at least one of the management device 10 and the mining machine 3 other than the own dump truck. The mining machine 3 other than the own dump truck includes the dump truck 2 other than the own dump truck in addition to the other mining machine 3 other than the dump truck 2.

The wireless communication device 34 receives the running path information sent from the wireless communication device 18 of the control facility 7 illustrated in FIG. 1, and outputs the running path information to the running path producing device 32. The GPS receiver 31 is connected to the wireless communication device 34.

Figure 5:
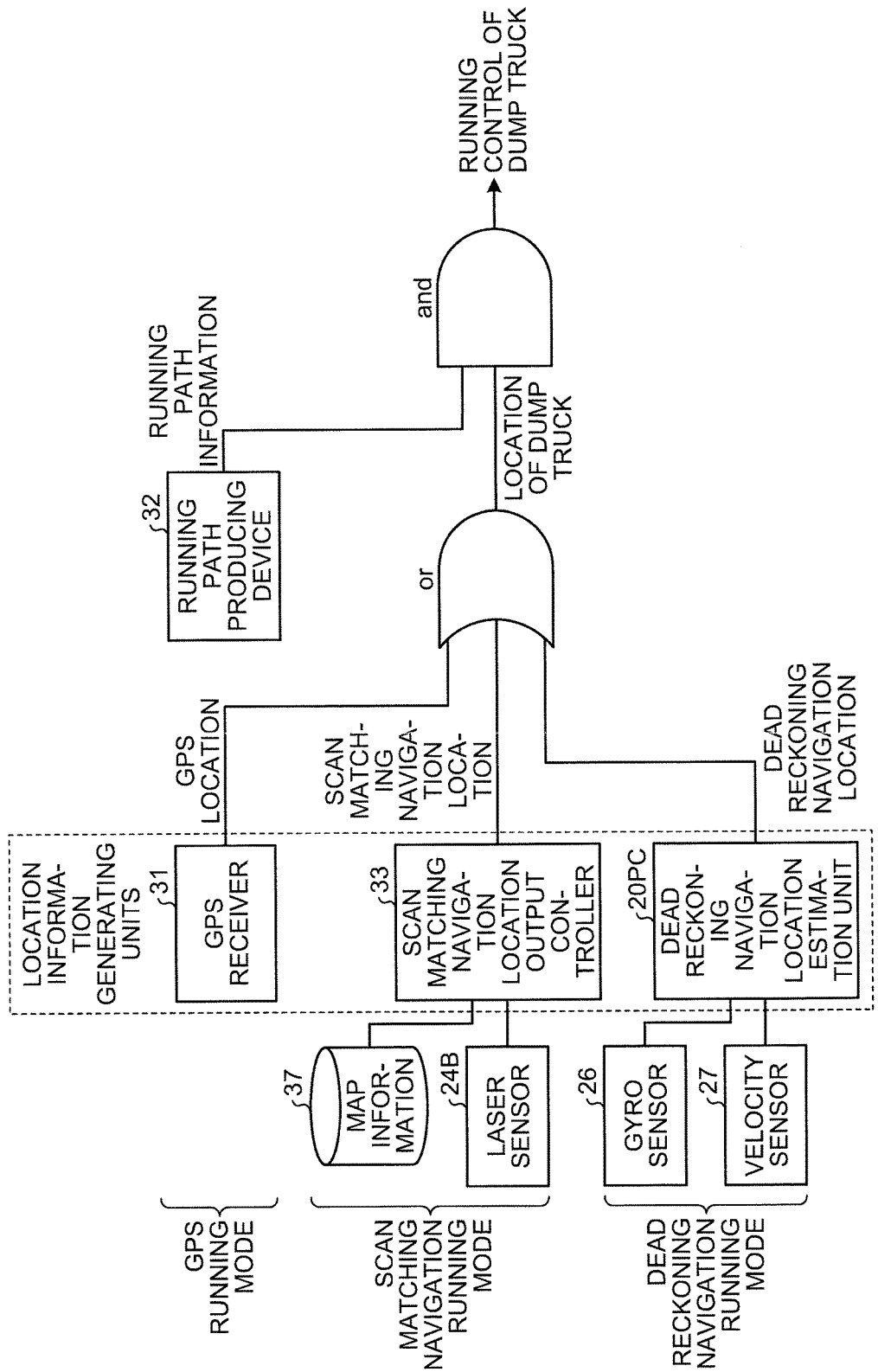
FIG. 5 is a diagram illustrating information required for running control of the dump truck in three running modes.

FIG. 5 is a diagram illustrating information required for running control of the dump truck in three running modes. In the present embodiment, the dump truck 2 runs in the three running modes. As illustrated in FIG. 5, a first running mode is such a running mode that the location of the dump truck is obtained using at least detection data of the GPS receiver 31 to cause the dump truck to autonomously run based on that location. The first running mode is appropriately referred to as a GPS running mode.

A second running mode is such a running mode that the location of the dump truck 2 is calculated using a method of scan matching navigation based on map information 37 produced in advance as described later and a detection result of the laser sensor 24B to cause the dump truck 2 to autonomously run based on the calculated location of the dump truck 2. The second running mode is appropriately referred to as a scan matching navigation running mode. As illustrated in FIG. 5, in the scan matching navigation running mode, the location of the dump truck 2 is calculated in the scan matching navigation location output controller 33.

A third running mode is such a running mode as to cause the dump truck 2 to autonomously run based on the location estimated by the dead reckoning navigation using a detection result of the gyro sensor 26 and a detection result of the velocity sensor 27. The third running mode is appropriately referred to as a dead reckoning navigation running mode. As illustrated in FIG. 5, in the dead reckoning navigation running mode, the location of the dump truck 2 is estimated in the dead reckoning navigation location estimation unit 20PC. The location information generating units in the present embodiment include the GPS receiver 31, the scan matching navigation location output controller 33, and the dead reckoning navigation location estimation unit 20PC.

The running modes of the present embodiment, namely, the GPS running mode, the scan matching navigation running mode, and the dead reckoning navigation running mode are different from one another in measurement accuracy for the location. The measurement accuracy for the location of the dump truck 2 obtained by these location information generating units is appropriately referred to as location measurement accuracy. In the present embodiment, the location measurement accuracy of the dump truck in the GPS running mode is higher than the location measurement accuracy of the dump truck in the scan matching navigation running mode and the dead reckoning navigation running mode, that is, an error from the actual location where the dump truck exists is small. The location measurement accuracy of the dump truck in the scan matching navigation running mode is higher than the location measurement accuracy of the dump truck in the dead reckoning navigation running mode. The degree of the location measurement accuracy of the dump truck in each running mode is not limited to that of the present embodiment.

<Location Detection of Dump Truck 2 Using GPS Receiver 31>

The GPS receiver 31 detects the GPS location that is the location of the dump truck 2 using the GPS. The GPS receiver 31 is one of the plurality of location information generating units held by the dump truck in the present embodiment. An antenna 31A that receives the information from the positioning satellite 5 is connected to the GPS receiver 31. The antenna 31A outputs, to the GPS receiver 31, a signal that is based on the information received from the positioning satellite 5. The GPS receiver 31 detects a location of the antenna 31A using the information from the positioning satellite 5.

In the process of detecting the location of the antenna 31A, based on, for example, the number of positioning satellites 5 from which the antenna 31A has received radio waves, the GPS receiver 31 outputs the fixed solution, the float solution, or the single solution indicating the accuracy of the detected GPS location. The GPS receiver 31 also outputs information indicating the state of the non-positioning when the GPS location is in the positioning calculation disability. In the present embodiment, when the location accuracy of the GPS is the fixed solution, the dump truck 2 can autonomously run based on the detected GPS location. When the location accuracy of the GPS is the float solution and the single solution, or when the GPS location is in the positioning calculation disability, the dump truck 2 does not autonomously run based on the detected GPS location. The location accuracy of the GPS and the condition as to whether the dump truck executes the autonomous running are not limited to those of the present embodiment.

The scan matching navigation location output controller 33 obtains the location of the dump truck 2 based on information of the object that exists in the vicinity of the running path RP obtained from the detection result of the laser sensor 24B, and on the map information 37 including a location of an object that exists in advance in the mine MR. The scan matching navigation location output controller 33 is one of the plurality of location information generating units held by the dump truck in the present embodiment.

In the present embodiment, the vehicle body controller 20, the running path producing device 32, and the scan matching navigation location output controller 33 are realized by, for example, a processor such as a central processing unit (CPU) and a memory. In this case, these functions are realized when the processor reads and executes the computer program stored in the memory. The memory corresponds to a non-volatile or volatile semiconductor memory such as a random access memory (RAM), a read only memory (ROM), a flash memory, an erasable programmable read only memory (EPROM), and an electrically erasable programmable read only memory (EEPROM), a magnetic disk, a flexible disk, and a magneto-optical disk. They may be realized by dedicated hardware. Alternatively, a plurality of processing circuits may realize these functions in cooperation with each other.

In the vehicle body controller 20 illustrated in FIG. 4, the processing unit 20P is the processor such as the CPU, the storage unit 20M is the memory, and the input/output unit 20IF is an interface circuit. The processing unit 20P realizes the function of the vehicle body controller 20 by reading and executing the computer program stored in the storage unit 20M. The computer program stored in the storage unit 20M includes that for realizing the method of controlling the work vehicle according to the present embodiment.

The radar 24A and the laser sensor 24B are connected to the second signal line 36. The laser sensor 24B is also connected to the scan matching navigation location output controller 33 in addition to the second signal line 36. This configuration allows the scan matching navigation location output controller 33 to directly receive a detection value of the laser sensor 24B.

The vehicle body controller 20 obtains detection values of the radar 24A and the laser sensor 24B via the second signal line 36. The vehicle body controller 20 can obtain a relative location between the dump truck 2 and the object using the detection values of the radar 24A and the laser sensor 24B. In other words, when the radar 24A and the laser sensor 24B detect a relative location with respect to the object, the relative location between the dump truck 2 and the object is detected.

The gyro sensor 26 detects an orientation or an orientation change amount of the dump truck 2. The gyro sensor 26 is connected to the vehicle body controller 20 and outputs a detection value that is the detection result to the vehicle body controller 20. The velocity sensor 27 detects a rotational velocity of the wheel of the dump truck 2 to detect a running velocity that is the velocity of the dump truck 2. The velocity sensor 27 is connected to the vehicle body controller 20 and outputs a detection value that is the detection result to the vehicle body controller 20. Next, control that is performed when the vehicle body controller 20 causes the dump truck 2 to autonomously run using the dead reckoning navigation will be described.

<Estimation of Location of Dump Truck 2 Using Dead Reckoning Navigation>

In the present embodiment, the vehicle body controller 20 causes the dump truck 2 to autonomously run using the dead reckoning navigation. Specifically, the dead reckoning navigation location estimation unit 20PC of the vehicle body controller 20 obtains a current location of the dump truck 2 using the dead reckoning navigation while the braking control unit 20PD, the drive control unit 20PE, and the steering control unit 20PF cause the dump truck 2 to autonomously run based on the running path RP included in the running path information received from the running path producing device 32. The dead reckoning navigation is navigation that estimates the current location of the dump truck 2 that is an object based on an orientation (orientation change amount) and a moving distance (velocity) from a known starting point.

The orientation (orientation change amount) of the dump truck 2 is detected by using the gyro sensor 26 held by the dump truck 2. The moving distance (velocity) of the dump truck 2 is detected by using the velocity sensor 27 held by the dump truck 2. The dead reckoning navigation location estimation unit 20PC obtains the location of the dump truck 2 using the obtained orientation (orientation change amount) of the dump truck 2 and the obtained moving distance (velocity) of the dump truck 2.

The vehicle body controller 20 calculates and outputs a control amount related to the running of the dump truck 2 using the obtained location of the dump truck 2 so that the dump truck 2 runs along the running path RP. The control amount includes a moving amount (braking command), a steering amount (steering command), and a running velocity adjustment amount (velocity command). The vehicle body controller 20 controls the running (manipulation) of the dump truck 2 using the calculated control amount so that the dump truck 2 runs along the running path RP.

The accuracy of the location estimation (accuracy of the location information) of the dump truck by means of the dead reckoning navigation is not so high. In a case where a running distance of the dump truck 2 by means of the dead reckoning navigation becomes longer, therefore, detection errors of one or both of the gyro sensor 26 and the velocity sensor 27 are accumulated, whereby an error might occur between the estimated location (estimation location) and the actual location. When the location of the dump truck 2 is obtained only by the dead reckoning navigation and the dead reckoning navigation running is continued, the error between the actual location of the dump truck 2 and the estimation location becomes too large, and it becomes difficult to continue the running. In the present embodiment, therefore, the vehicle body controller 20 may correct the location (estimation location) of the dump truck 2 obtained by the dead reckoning navigation using a location obtained by a method with higher accuracy such as, for example, the location obtained by the GPS receiver 31 and the location obtained by the scan matching navigation location output controller 33. Next, a process performed by the scan matching navigation location output controller 33 to obtain the location of the dump truck 2 will be described.

<Calculation of Location of Dump Truck 2 Using Scan Matching Navigation Location Output Controller 33>

The scan matching navigation location output controller 33 obtains the location of the dump truck 2 using the detection value of the laser sensor 24B and the map information 37 of the mine MR produced in advance. In other words, the scan matching navigation location output controller 33 arithmetically operates the location of the dump truck 2 by matching the detection result of the laser sensor 24B with the map information 37.

In this case, the scan matching navigation location output controller 33 obtains the location of the dump truck 2 using the detection value of the laser sensor 24B and the map information 37, and outputs the location of the dump truck 2 to the first signal line 35. The vehicle body controller 20 receives, via the first signal line 35, the location of the dump truck 2 obtained by the scan matching navigation location output controller 33, and causes the dump truck 2 to run along the running path RP.

The map information 37 is information including a location of the object (e.g., the bank BK and the side wall) provided in the vicinity of the running path RP or the like of the mine MR. The map information 37 is connected to the first signal line 35. The map information 37 needs to be produced in advance before the location of the dump truck is calculated by the scan matching navigation. In order to produce the map information 37, for example, the detection result of the laser sensor 24B in the dump truck 2 that runs on the haul lane HL can be used. For example, in a case where the location of the dump truck 2 can be obtained by the GPS receiver 31 with high accuracy, the presence or absence and the location of the bank BK provided in the vicinity of the haul lane HL are detected by the laser sensor 24B, and the presence or absence and the location data of the bank BK can be stored at any time in the map information 37 corresponding to the haul lane HL.

Figure 6:
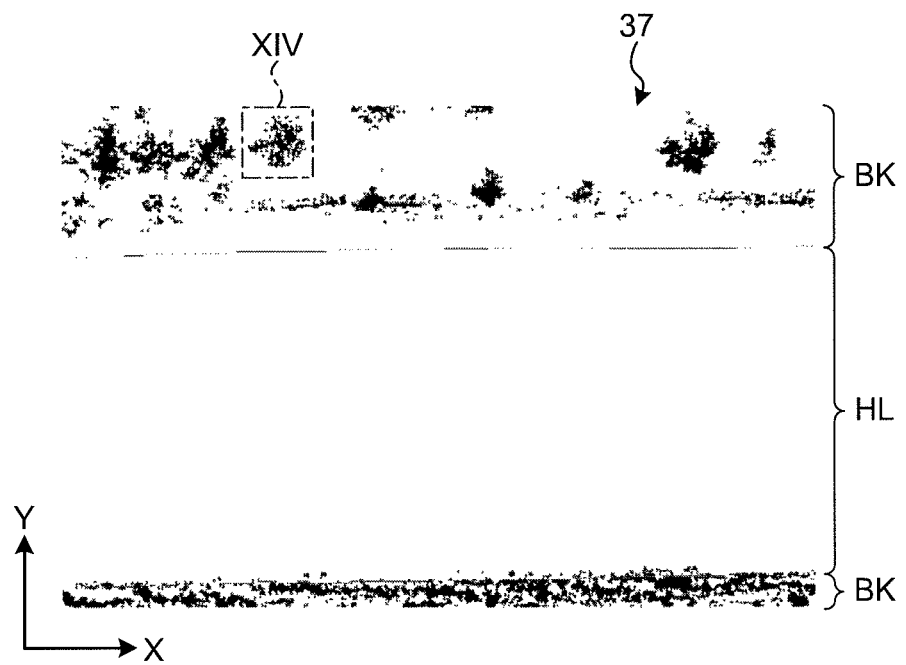
FIG. 6 is a diagram illustrating a part of map information in the first embodiment.
Figure 7:
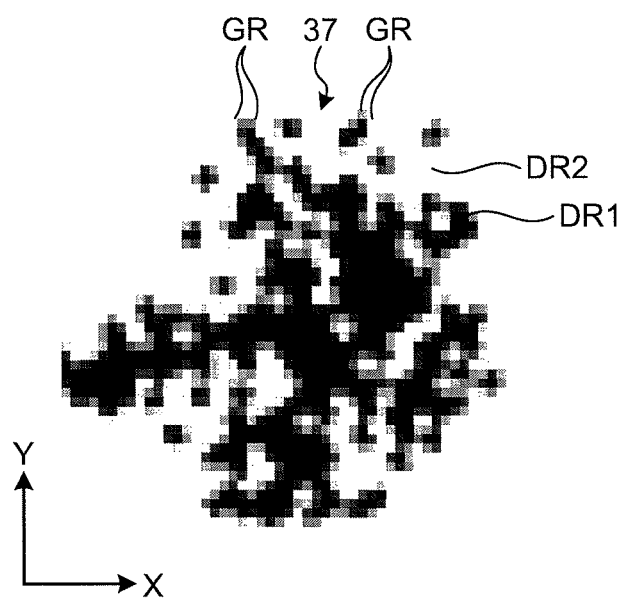
FIG. 7 is an enlarged diagram illustrating an XIV part in FIG. 6.

FIG. 6 is a diagram illustrating a part of the map information 37 in the first embodiment. A part of the map information 37 in FIG. 6 represents the detection result of the bank BK obtained by the radar sensor 24B in a region around the haul lane HL. The haul lane HL is a blank region in a central part extending in an X direction of FIG. 6, and the bank BK is regions with patchy patterns of black and white in an upper part and a lower part of FIG. 6. FIG. 7 is an enlarged diagram illustrating an XIV part in FIG. 6. As illustrated in FIGS. 6 and 7, the map information 37 indicates, in a plane view, a location of a grid GR in an XY coordinate system and whether the bank BK exists in each grid GR. The grid GR is the mine MR divided into a predetermined size.

In the present embodiment, regarding each grid GR in the map information 37, a grid DR1 at a location where the bank BK has been detected is represented by a black square in the drawing, and a grid DR2 at a location where the bank BK has not been detected is represented by a white square in the drawing. The map information 37 stores the presence or absence and the location information of the bank BK. The map information 37 is an external storage device (auxiliary storage device) including at least one of an ROM, a flash memory, and a hard disk drive.

Figure 8:
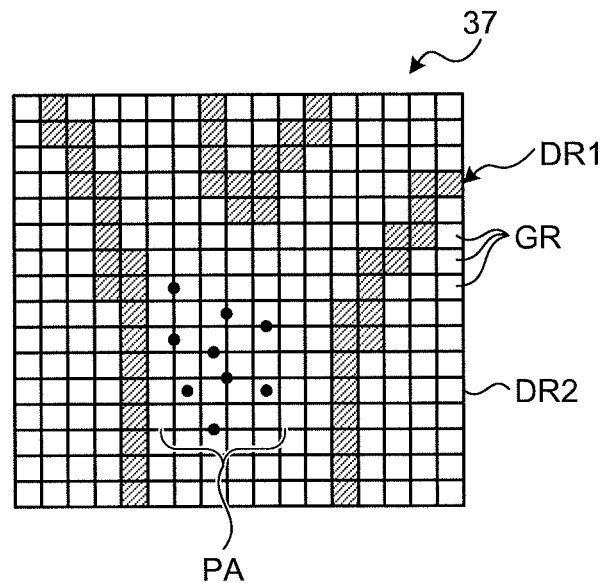
FIG. 8 is a schematic diagram illustrating an exemplary partial region of the map information according to the first embodiment.
Figure 9:
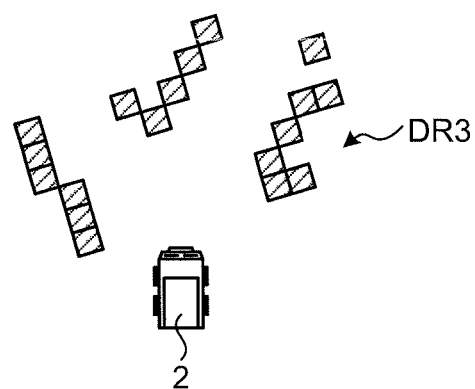
FIG. 9 is a schematic diagram illustrating an exemplary detection result of a bank obtained by a laser sensor when the dump truck runs on the haul lane.
Figure 10:
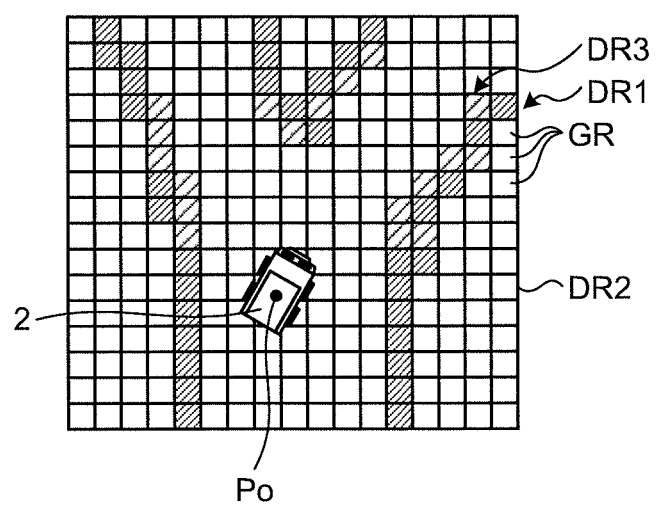
FIG. 10 is a schematic diagram illustrating the map information of FIG. 8 matched with the detection result of the laser sensor of FIG. 9, and illustrating a location of the own dump truck calculated by scan matching navigation.

FIG. 8 is a schematic diagram illustrating an exemplary partial region of the map information 37 according to the first embodiment. FIG. 9 is a schematic diagram illustrating an exemplary detection result of the bank BK obtained by the laser sensor 24B when the dump truck runs on the haul lane HL. FIG. 10 is a schematic diagram illustrating the map information of FIG. 8 matched with the detection result of the laser sensor 24B of FIG. 9, and illustrating the location of the own dump truck calculated by the scan matching navigation. In FIGS. 8 to 10, the grid DR1 at the location where the bank BK exists in the map information 37 is represented by narrow parallel oblique lines, and a grid DR3 at a location where the bank BK has been detected by the laser sensor 24B is represented by a broad parallel oblique lines.

The calculation of the location of the dump truck by means of the scan matching navigation illustrated in FIGS. 8 to 10 is performed by the scan matching navigation location output controller 33. In the calculation of the location of the own dump truck performed by the scan matching navigation location output controller 33, by using a plurality of points (particles) PA virtually arranged within a range in which the dump truck is predicted to exist at a certain point of time, it is possible to calculate the location of the dump truck that is close to a true location while suppressing a calculation cost. Since the location estimation by means of the particles is a known method, a detailed explanation will be omitted.

In the map information 37 illustrated in FIG. 8, each of the squares is the grid GR. The colored grid DR1 is the grid where the bank BK has been detected, and the white grid DR2 represents the grid where the bank BK has not been detected. FIG. 9 is a diagram illustrating the grid DR3 that is detection data actually detected by the laser sensor 24B of the dump truck.

The map information 37 illustrated in FIG. 8 is matched with the detection result of the laser sensor 24B illustrated in FIG. 9, and, as illustrated in FIG. 10, a final estimation value (expected value) Po of a location where a probability that the dump truck 2 exists is possibly the highest is calculated using the method of the location estimation by means of the particles. The scan matching navigation location output controller 33 outputs the most approximate location as the location information of the dump truck 2. In the present embodiment, the location information of the dump truck 2 may include orientation information indicating the orientation of the dump truck 2.

The vehicle body controller 20 obtains the location of the dump truck 2 output by the scan matching navigation location output controller 33. The vehicle body controller 20 controls the running of the dump truck 2 using the obtained information so that the dump truck 2 runs along the running path RP.

The dump truck 2 that works in the mine MR illustrated in FIG. 1 might activate a brake while running on the haul lane HL, the loading place LPA, and the discharging place DPA to stop. The accuracy of the location that is required when the dump truck 2 stops is different depending on a stopping place or a purpose. In the present embodiment, the accuracy of the location that is required at the time of the stop of the dump truck 2 is determined on the basis of to what extent a displacement between a target location for the stop and a location where the dump truck 2 has actually stopped is acceptable. The accuracy of the location that is required at the time of the stop of the dump truck 2 is appropriately referred to as target location accuracy.

In the haul lane HL, for example, the dump truck 2 might stop at the intersection IS, or stop since traffic congestion occurs just before the loading place LPA or the discharging place DPA. In the haul lane HL, however, the dump truck 2 runs with a certain interval kept. At the time of the stop, the dump truck 2 stops with a certain interval kept from the intersection IS or a vehicle ahead. Therefore, even if the location where the dump truck 2 stops is somewhat displaced, operation of the mine MR is hardly affected. Consequently, the accuracy of the target location that is required when the dump truck 2 stops in the haul lane HL becomes relatively low. This is not limited to the haul lane HL. Even in a case where the dump truck 2 stops on the running path RP on its way to a destination such as a loading location which will be described next, the target location accuracy becomes relatively low.

In the loading place LPA, the dump truck 2 might stop at the loading location so that, for example, the loading machine 3S can load ore or the like onto the dump truck 2. In this case, since the dump truck 2 needs to stop near the loading machine 3S, the target location accuracy required when the dump truck 2 stops at the loading location is higher than the target location accuracy required when the dump truck 2 stops on the running path RP. The target location accuracy may be changed depending on whether the loading machine 3S is an excavator type (backhoe) illustrated in FIG. 1 including a caterpillar track and an upper swing body, or a loader type (front end) including a tire. In this case, the target location accuracy for the excavator type is preferably higher than the target location accuracy for the loader type.

In the discharging place DPA, the dump truck 2 might stop at a discharging location for the crusher CR to, for example, discharge the burden into the crusher CR illustrated in FIG. 1. Since a throw opening through which the burden is thrown in the crusher CR is not large as compared with the vessel 22 of the dump truck 2, the dump truck 2 needs to stop at a precise location when the burden is discharged in the crusher CR. When the dump truck 2 stops at a location displaced from the throw opening of the crusher CR, the burden might be spilled from the throw opening, or the dump truck 2 might come into contact with the crusher CR illustrated in FIG. 1. Therefore, the target location accuracy required when the dump truck 2 stops at the discharging location for the crusher CR is higher than the target location accuracy at the loading location in the loading place LPA.

Examples of another situation in which the dump truck 2 stops include a case where soil is discharged sequentially from an end of a broad region within the discharging place DPA, a case where an edge of the discharging place DPA is formed into a cliff and soil is discharged to a cliff bottom, a case where the dump truck 2 is parked in a parking lot, and a case where the dump truck 2 stops at a fueling place. In each of these situations, the target location accuracy required when the dump truck 2 stops may be set in any way. For example, the target location accuracy required when the dump truck 2 stops may be set to be equal to the target location accuracy required when the dump truck 2 stops on the running path RP, may be set to be equal to the target location accuracy required when the dump truck 2 stops at the loading location, and may be set to be equal to the target location accuracy required when the dump truck 2 stops at the discharging location for the crusher CR. The target location accuracy required when the dump truck 2 stops may be set to the location accuracy between the target location accuracy required when the dump truck 2 stops on the running path RP and the target location accuracy required when the dump truck 2 stops at the loading location. Alternatively, the target location accuracy required when the dump truck 2 stops may be set to the target location accuracy between the target location accuracy required when the dump truck 2 stops at the loading location and the target location accuracy required when the dump truck 2 stops at the discharging location for the crusher CR.

Figure 11:
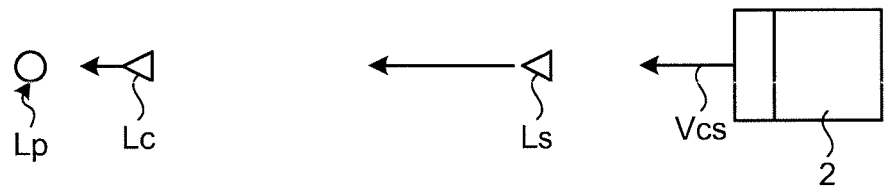
FIG. 11 is a diagram illustrating locations associated with the stop of the dump truck.
Figure 12:
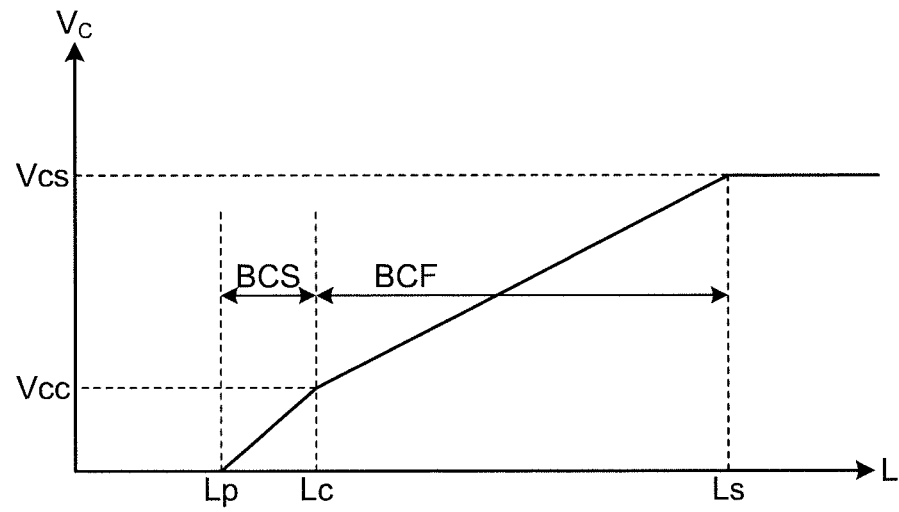
FIG. 12 is a diagram for explaining control that is executed by the vehicle body controller when the dump truck stops.

FIG. 11 is a diagram illustrating locations associated with the stop of the dump truck 2. FIG. 12 is a diagram for explaining control that is executed by the vehicle body controller 20 when the dump truck 2 stops. A vertical axis of FIG. 12 represents a velocity Vc of the dump truck 2, and a horizontal axis represents a location L of the dump truck 2. When the current location of the dump truck 2 approaches a target stop location Lp included in the running path information, the vehicle body controller 20 illustrated in FIG. 4 controls the braking device 2B using the velocity information of the running path RP included in the running path information to generate braking force. The control that is executed by the vehicle body controller 20 at the time of the braking of the dump truck is appropriately referred to as braking control. The braking control is executed when the vehicle body controller 20 causes the dump truck 2 to autonomously run. The vehicle body controller 20 executes the braking control in either case where the dump truck 2 stops or reduces its velocity as long as the dump truck 2 is under braking.

In the example illustrated in FIG. 11, the vehicle body controller 20 starts the braking control when the dump truck 2 reaches a location Ls. The location Ls is appropriately referred to as a control start location Ls. Upon executing the braking control, the vehicle body controller 20 obtains braking force FB that is generated by the braking device 2B. As illustrated in FIG. 12, the velocity of the dump truck 2 at a timing when the vehicle body controller 20 starts the braking control, that is, the velocity of the dump truck 2 at the control start location Ls is assumed to be Vcs.

The braking force FB can be obtained by Formula (1).

$$FB = G \times m \times Vc^2 / (2 \times d) \quad (1)$$

In Formula (1), G is a braking force gain, m is mass of the vehicle body, Vc is the velocity of the dump truck 2, and d is a target distance. The braking force gain G is the control information for controlling the braking device 2B. The braking force gain G is determined by the location measurement accuracy (first accuracy) of the dump truck 2 obtained by the location information generating units of the dump truck 2, and the target location accuracy (second accuracy) indicating how accurately the dump truck 2 is expected to stop with respect to the target stop location. This point will be described later.

The mass m of the vehicle body is the sum of mass of the dump truck 2 and mass of the burden. The mass of the burden can be obtained by, for example, a load cell provided in the dump truck 2. The velocity Vc is the detection value of the velocity sensor 27 illustrated in FIG. 3. The vehicle body controller 20 obtains the velocity Vc from the velocity sensor 27 at every control cycle. The target distance d is a distance along the running path RP between a current location Ln of the dump truck 2 and the target stop location Lp. At the time of starting the braking control, the braking force FB obtained from Formula (1) is $G \times m \times Vcs^2 / (2 \times (Ls - Lp))$.

When obtaining the braking force FB, the vehicle body controller 20 may calculate in consideration of an inclination pitch angle of the running path RP. The inclination pitch angle of the running path RP can be calculated from the coordinate of each point PI on the running path RP illustrated in FIG. 2. When the inclination pitch angle is positive (upslope), the vehicle body controller 20 subtracts the braking force FB. When the inclination pitch angle is negative (downslope), the vehicle body controller 20 adds the braking force FB.

When the dump truck 2 approaches the target stop location Lp beyond the braking start location Ls, the vehicle body controller 20 increases the braking force FB of the braking device 2B so that the braking force FB is equal to or larger than the previous braking force FB, and preferably, so that the braking force FB is larger than the previous braking force FB, whereby the dump truck 2 can be stopped at the target stop location Lp with good accuracy. In the present embodiment, in a case where the target distance d becomes a predetermined threshold value dc, the vehicle body controller 20 causes the braking device 2B to generate the stronger braking force FB when the dump truck 2 reaches a location Lc in the example illustrated in FIGS. 11 and 12. The location Lc is appropriately referred to as a control change location. After the target distance d becomes the predetermined threshold value dc, the vehicle body controller 20 obtains the braking force FB using a method different from the method of Formula (1). As the braking force FB that is generated after the control change location Lc is reached, such braking force FB may be employed that the braking force FB obtained by Formula (1) is multiplied by a predetermined multiplying factor. Alternatively, no restriction may be imposed on the braking force FB, that is, the braking force FB may be generated by full braking. Although magnitude of the threshold value dc is not limited, it is smaller than a distance between the control start location Ls and the target stop location Lp.

As described above, the braking control includes first control BCF that causes the braking device 2B of the dump truck 2 that has reached the control start location Ls to generate the braking force, and second control BCS that causes the braking device 2B to generate the braking force FB equal to or larger than the first control BCF when the dump truck 2 reaches the control change location Lc (refer to FIG. 12). The first control BCF is executed before the second control BCS. In the first control BCF, that is, between the control start location Ls and the control change location Lc, the vehicle body controller 20 can change the braking force FB by changing magnitude of the braking force gain G of Formula (1) in accordance with the situation. As described above, the braking force gain G is information for changing the braking force FB at the time of the first control BCF.

Figure 13:
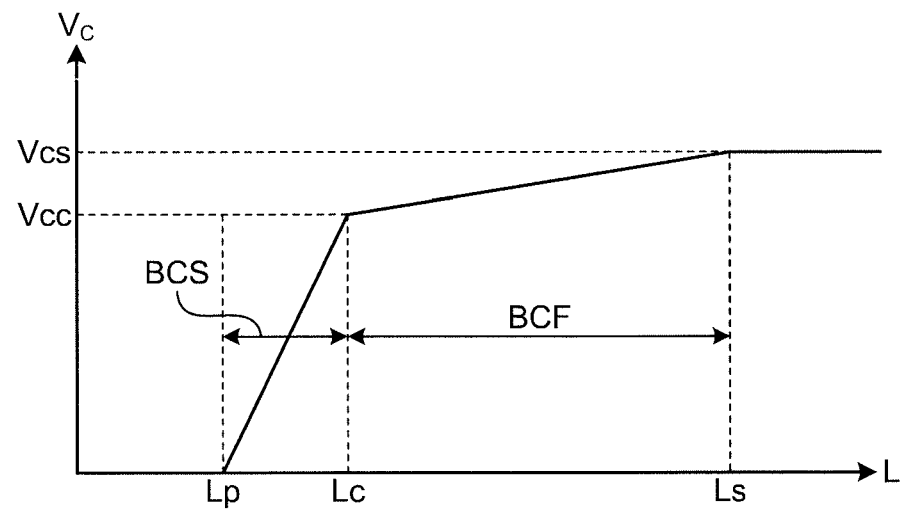
FIG. 13 is a diagram illustrating a relation between a velocity and a location obtained when a braking force gain is relatively smaller than that illustrated in FIG. 12.
Figure 14:
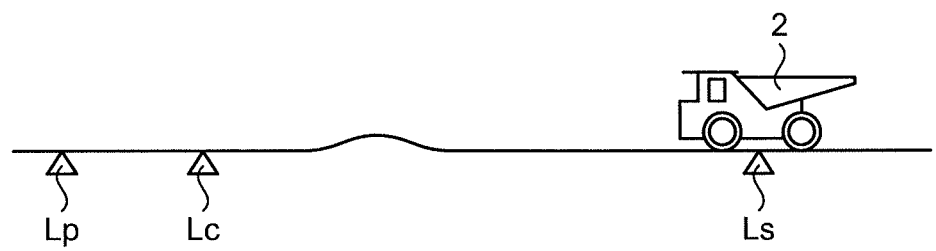
FIG. 14 is a diagram illustrating the dump truck that stops when the braking force gain is relatively small.
Figure 15:
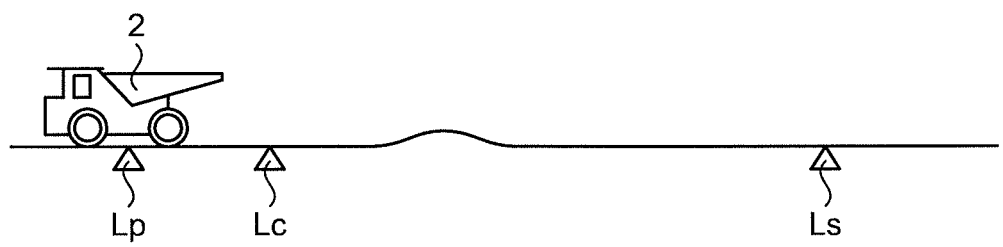
FIG. 15 is a diagram illustrating the dump truck that stops when the braking force gain is relatively small.
Figure 16:
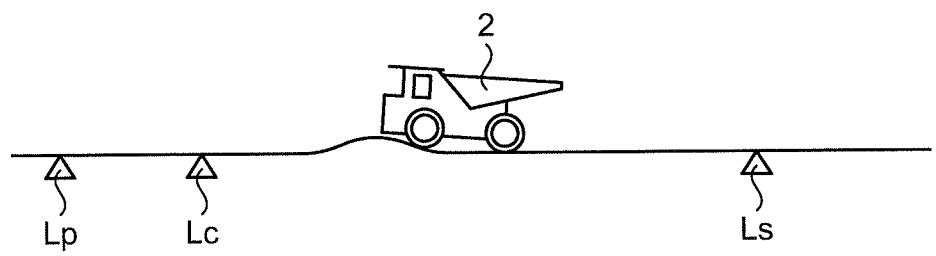
FIG. 16 is a diagram illustrating the dump truck that stops when the braking force gain is relatively large.

FIG. 13 is a diagram illustrating a relation between the velocity Vc and the location L obtained when the braking force gain G is relatively smaller than that illustrated in FIG. 12. FIGS. 14 and 15 are diagrams illustrating the dump truck 2 that stops when the braking force gain G is relatively small. FIG. 16 is a diagram illustrating the dump truck 2 that stops when the braking force gain G is relatively large.

In the present embodiment, since the vehicle body controller 20 causes the braking device 2B to generate the larger braking force FB in the second control BCS, an impact occurs on the dump truck 2 when the dump truck 2 stops.

When the braking force gain G is relatively small, the braking device 2B of the dump truck 2 has the small braking force FB at the time of the first control BCF. Then, as illustrated in FIG. 13, during a period after the first control BCF is started at the control start location Ls of FIG. 14 and before the first control BCF is ended at the control change location Lc, the reduction in the velocity Vc of the dump truck 2 becomes small. Therefore, the dump truck 2 has a high velocity Vcc when starting the second control BCS. As a result, the dump truck 2 urgently stops at the target stop location Lp. When the braking force gain G is relatively small, the impact that occurs on the dump truck 2 is large. When the braking force gain G is relatively small, however, a certain level of velocity is maintained even immediately before the target stop location Lp. Therefore, for example, even when an unexpected protrusion, track or the like exists between the control start location Ls and the target stop location Lp as illustrated in FIGS. 14 and 15, it is possible to get over the protrusion, the track or the like as long as the certain level of velocity is maintained. As a result, as illustrated in FIG. 15, the accuracy of the location where the dump truck 2 stops is high.

When the braking force gain G is relatively large, the braking device 2B of the dump truck 2 has the large braking force FB at the time of the first control BCF. Then, as illustrated in FIG. 12, during the period after the first control BCF is started at the control start location Ls of FIG. 14 and before the first control BCF is ended at the control change location Lc, the reduction in the velocity Vc of the dump truck 2 becomes large. Therefore, the dump truck 2 has a low velocity Vcc when starting the second control BCS. As a result, as illustrated in FIG. 16, the dump truck 2 sometimes stops before the target stop location Lp. When the braking force gain G is relatively large, the degree of velocity reduction by the second control BCS is small. Therefore, the impact that occurs on the dump truck 2 is small. However, as illustrated in FIG. 16, for example, when an unexpected protrusion, track or the like exists between the control start location Ls and the target stop location Lp, the velocity of the dump truck 2 might not be enough for the dump truck 2 to get over the protrusion, the track or the like, and the dump truck 2 might stop. As a result, the accuracy of the location where the dump truck 2 stops becomes low.

As described above, the accuracy of the location where the dump truck 2 stops and the impact that occurs on the dump truck 2 caused by changing the braking force gain G have a trade-off relation. The accuracy of the location where the dump truck 2 stops when the braking control is performed by changing the braking force gain G is appropriately referred to as braking control accuracy RPc. When the dump truck 2 performs the braking control based on the location of the own dump truck obtained by the location information generating units having predetermined location measurement accuracy PP, the accuracy PRp of the location where the dump truck 2 finally stops (appropriately referred to as stop location accuracy) is represented by the sum of the location measurement accuracy (first accuracy PP) of the dump truck 2 obtained by the location information generating unit of the dump truck 2 and the braking control accuracy PRc as represented in Formula (2).

$$PRp = PP + PRc \qquad (2)$$

As can be understood from Formula (2), even when the braking control accuracy PRc is low, the reduction in the stop location accuracy PRp is suppressed as long as the location measurement accuracy PP is high. Similarly, even when the location measurement accuracy PP is low, the reduction in the stop location accuracy PRp is suppressed as long as the braking control accuracy PRc is high.

The dump truck 2 is configured such that wear of the tire, a load on each part of the vehicle body, and a load on the braking device 2B are decreased by reducing the impact at the time of the braking. In the braking control, therefore, the impact at the time of the braking is expected to be as small as possible. In order to reduce the impact that occurs on the dump truck 2, the braking force gain G only needs to be increased in the first control BCF. When the braking force gain G is large, however, the braking control accuracy PRc becomes low.

When the dump truck 2 is stopped at a predetermined place, the stop location accuracy PRp that is the accuracy of the location where the dump truck 2 stops only needs to satisfy the target location accuracy PST (second accuracy) that is the location accuracy required at the time of the stop of the dump truck 2 at the predetermined place. Formula (2) can be rewritten as Formula (3).

$$PST=PP+PRc \quad (3)$$

In order to reduce the impact that occurs when the dump truck 2 stops, the braking force gain G needs to be increased, that is, the braking control accuracy PRc needs to be reduced. It can be understood from Formula (3) that a certain level of accuracy is ensured for the target location accuracy PST even when the braking control accuracy PRc is low as long as the location measurement accuracy PP is high. When the location measurement accuracy PP is low and the target location accuracy PST is high, the braking control accuracy PRc needs to be increased in order to ensure the target location accuracy PST. In this case, the braking force gain G needs to be reduced. As a result, the impact that occurs when the dump truck 2 stops is increased.

The target location accuracy PST is determined by the running path information. Therefore, when the required target location accuracy PST is not so high, the control system 30 reduces the braking control accuracy PRc if the location measurement accuracy PP is ensured, thereby reducing the impact that occurs at the time of the stop of the dump truck 2, and ensuring the required degree of the stop location accuracy PRp. When the location measurement accuracy PP cannot be ensured, the control system 30 increases the braking control accuracy PRc, thereby ensuring the required degree of the stop location accuracy PRp. In this case, the impact that occurs at the time of the stop of the dump truck 2 is increased.

When the very high target location accuracy PST is required, even if the location measurement accuracy PP is high, the control system 30 increases the braking control accuracy PRc, thereby ensuring the required stop location accuracy PRp. In this case, the impact that occurs at the time of the stop of the dump truck 2 is increased.

In the present embodiment, in a case where the location measurement accuracy PP is constant, the control system 30 increases the braking control accuracy PRc to cause the dump truck 2 to stop at the target stop location Lp without fail when the target location accuracy PST is high, and the control system 30 reduces the impact that occurs at the time of the stop of the dump truck 2 when the target location accuracy PST is low. The control system 30 reduces the braking control accuracy PRc as the location measurement accuracy PP becomes high to ensure the accuracy of the location where the dump truck 2 stops and decrease the impact that occurs at the time of the stop of the dump truck 2.

For this purpose, in the present embodiment, the braking force gain G is set in accordance with the location measurement accuracy PP (first accuracy) and the target location accuracy PST (second accuracy). Specifically, the high braking force gain G is set in the first control BCF so that the impact that occurs when the dump truck 2 stops is reduced as the location measurement accuracy PP that is the first accuracy becomes high or as the target location accuracy PST that is the second accuracy becomes low. The low braking force gain G is set in the first control BCF so that the target location accuracy PST at the time of the stop of the dump truck 2 can be ensured as the location measurement accuracy PP that is the first accuracy becomes low, or as the target location accuracy PST that is the second accuracy becomes high.

As described above, in the present embodiment, the braking force gain G is set in accordance with the target location accuracy PST and the location measurement accuracy PP. Therefore, even when the stopping place and the location measurement accuracy PP are changed, the accuracy of the location where the dump truck 2 stops can be ensured while the suppression of the impact at the time of the stop of the dump truck 2 is suppressed.

Figures 17, 18:
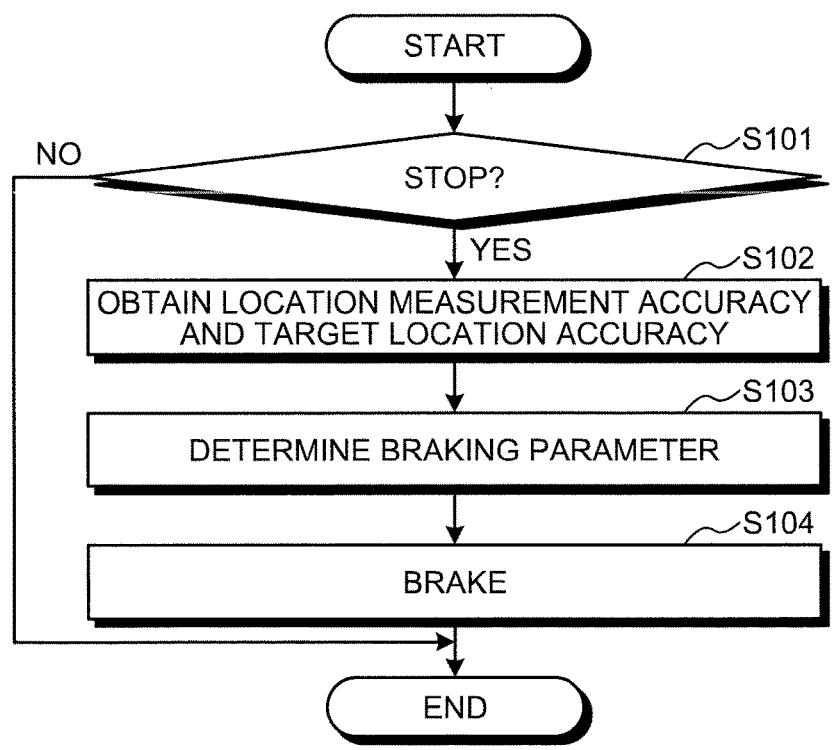
FIG. 17 is a diagram illustrating an exemplary data table TB in which the braking force gains G are described.
FIG. 18 is a flowchart illustrating exemplary braking control according to the first embodiment.

FIG. 17 is a diagram illustrating an exemplary data table TB in which the braking force gains G are described. In the data table TB, nine braking force gains in total including braking force gains G11 to G33 are described. The numbers 11 to 33 are identifiers for identifying the braking force gain G. The braking force gain G is unambiguously determined once the location measurement accuracy PP (first accuracy) and the target location accuracy PST (second accuracy) are determined. An alphabet L attached to the location measurement accuracy PP and the target location accuracy PST represents that the accuracy is relatively low, M represents that the accuracy is higher than L, and H represents that the accuracy is higher than M. In the present embodiment, both of the location measurement accuracy PP and the target location accuracy PST have the three levels. However, the levels are not limited to the three levels, and may be two levels and four or more levels. The levels of the location measurement accuracy PP and the levels of the target location accuracy PST may be different. For example, the location measurement accuracy PP may have the two levels and the target location accuracy PST may have the three levels. The location measurement accuracy PP and the target location accuracy PST may not be provided with the levels, and may be represented by numerical values. In this case, the braking force gain G can be calculated from the numerical values of the location measurement accuracy PP and the target location accuracy PST.

In the present embodiment, an example of the PPH having the high location measurement accuracy PP (first accuracy) includes the time of the GPS running mode. The PPM having the middle degree of the location measurement accuracy PP corresponds to, for example, the time of the scan matching navigation running mode, and the PPL having the low location measurement accuracy PP corresponds to, for example, the time of the dead reckoning navigation running mode. The PSTH indicating that the place has the high target location accuracy PST (second accuracy) corresponds to, for example, stopping at the discharging location for the crusher CR. The PSTM that is the place having the middle degree of the target location accuracy PST corresponds to, for example, stopping at the loading location, and the PSTL that is the place having the low target location accuracy PST corresponds to, for example, stopping on the running path RP.

The braking force gains G11, G12, G13 at the time of the location measurement accuracy PPL increase in this order, the braking force gains G21, G22, G23 at the time of the location measurement accuracy PPM increase in this order, and the braking force gains G31, G32, G33 at the time of the location measurement accuracy PPH increase in this order. In other words, the braking force gain G is set so that the impact that occurs when the dump truck 2 stops is reduced as the target location accuracy PST becomes low as long as the location measurement accuracy PP is the same. A specific numerical value of each braking force gain G may be appropriately set.

The braking force gains G11, G21, G31 at the time of the target location accuracy PSTH increase in this order, the braking force gains G12, G22, G32 at the time of the target location accuracy PSTM increase in this order, and the braking force gains G13, G23, G33 at the time of the target location accuracy PSTH increase in this order. In other words, the braking force gain G is set so that the impact that occurs when the dump truck 2 stops is reduced as the location measurement accuracy PP becomes high as long as the target location accuracy PST is the same. In still other words, the braking force gains G11 to G33 in FIG. 17 are configured such that the braking force gain is increased toward the lower right, and the braking force gain is reduced toward the upper left.

The data table TB is stored in the storage unit 20M of the vehicle body controller 20 illustrated in FIG. 4. When the vehicle body controller 20 executes the braking control, the processing unit 20P, specifically, the braking parameter determination unit 20PB reads the data table TB from the storage unit 20M to obtain the braking force gain G corresponding to the location measurement accuracy PP and the target location accuracy PST determined by the braking parameter determination unit 20PB at every control cycle. The braking control unit 20PD then obtains the braking force FB in the first control BCF using the braking force gain G obtained by the braking parameter determination unit 20PB to generate and output an instruction for causing the braking device 2B to generate the obtained braking force FB.

FIG. 18 is a flowchart illustrating exemplary braking control according to the first embodiment. The braking control according to the present embodiment is such control that the vehicle body controller 20 of the control system 30 controls the braking device 2B of the dump truck 2 to stop the dump truck 2. The braking control according to the present embodiment corresponds to the method of controlling the work vehicle according to the present embodiment. In step S101, the judgment unit 20PA of the processing unit 20P of the vehicle body controller 20 illustrated in FIG. 4 judges whether to stop the dump truck 2. In this judgment, the judgment unit 20PA judges whether to stop the dump truck 2 based on the running path information obtained from the running path producing device 32 illustrated in FIG. 3 and the current location of the dump truck 2. For example, when the dump truck 2 reaches the control start location Ls, the judgment unit 20PA judges that the control for stopping the dump truck 2 is to be started.

In step S101, when the judgment unit 20PA judges that the dump truck 2 is not to be stopped (step S101, No), the braking control according to the present embodiment is ended. In step S101, when the judgment unit 20PA judges that the dump truck 2 is to be stopped (step S101, Yes), the braking parameter determination unit 20PB of the processing unit 20P obtains, in step S102, the location measurement accuracy PP and the target location accuracy PST. The location measurement accuracy PP is determined on the basis of the location information generating units illustrated in FIG. 5, namely, the positioning state output by the GPS receiver 31, the state of the scan matching navigation location output controller 33, and the dead reckoning navigation location estimation unit 20PC.

In the present embodiment, for example, when the output of the GPS receiver 31 is the fixed solution, the vehicle body controller 20 employs the GPS running mode as the running mode. In this case, the location measurement accuracy PP selected by the braking parameter determination unit 20PB is high, namely, the PPH.

When the output of the GPS receiver 31 is the float solution or the single solution, or the GPS location is the state of the non-positioning, the state of the scan matching navigation location output controller 33 is referred to. Specifically, when the state of the scan matching navigation location output controller 33 is normal, and predetermined location estimation accuracy can be ensured by the scan matching navigation, the vehicle body controller 20 employs the scan matching navigation running mode as the running mode. In this case, the location measurement accuracy PP selected by the braking parameter determination unit 20PB is middle, namely, the PPM.

When the state of the scan matching navigation location output controller 33 is abnormal, or predetermined location estimation accuracy cannot be ensured by the scan matching navigation, the vehicle body controller 20 employs the dead reckoning navigation running mode as the running mode. In this case, the location measurement accuracy PP selected by the braking parameter determination unit 20PB is low, namely, the PPL. For this selection, the vehicle body controller 20 sends, to the braking parameter determination unit 20PB, information as to which running mode has been employed.

Since the target location accuracy PST is included in the running path information of the target stop location Lp, the braking parameter determination unit 20PB obtains the target location accuracy PST from the running path information generated by the running path producing device 32.

Next, in step S103, the braking parameter determination unit 20PB reads the data table TB from the storage unit 20M to obtain the braking force gain G corresponding to the location measurement accuracy PP and the target location accuracy PST determined in step S102. The braking parameter determination unit 20PB determines the obtained braking force gain G as the braking force gain G that is used in the present control cycle. In step S104, the braking control unit 20PD obtains the braking force FB using the braking force gain G determined by the braking parameter determination unit 20PB and using Formula (1) to control the braking device 2B so that the braking device 2B has the obtained braking force FB, thereby braking the dump truck 2.

At the time of the stop of the dump truck 2, the present embodiment can suppress the impact at the time of the stop while realizing the different target location accuracy PST that depends on the place where the dump truck 2 stops. The configuration of the present embodiment can also be appropriately applied to the following embodiment.

Second Embodiment

While the first embodiment is the braking control that is used when the dump truck 2 stops, a second embodiment is braking control that is used when the dump truck 2 running in the mine MR reduces its velocity before it enters a curve. In the second embodiment, the dump truck 2, the control system 30, and the vehicle body controller 20 are the same as those of the first embodiment.

FIG. 19 is a diagram illustrating the dump truck 2 that enters a curve. As illustrated in FIG. 19, when the running dump truck 2 enters a curve CN, the dump truck 2 needs to reduce the velocity Vc to a velocity limit set at every curve CN or less before it enters the curve CN. The velocity limit is set, for example, based on a radius of curvature R of the curve CN. Specifically, the smaller the radius of curvature R of the curve CN is, the lower the velocity limit becomes.

When the dump truck 2 enters the curve CN, the vehicle body controller 20 illustrated in FIG. 4 starts the braking control according to the second embodiment once the dump truck 2 illustrated in FIG. 19 reaches the control start location Ls. The vehicle body controller 20 then reduces, before reaching a target velocity reduction end location Lpi, the velocity Vc of the dump truck 2 to the velocity limit of the curve CN or less. The target velocity reduction end location Lpi is an entrance CNI of the curve CN. In the second embodiment, the dump truck 2 is not completely stopped at the target velocity reduction end location Lpi. Unlike the first embodiment, therefore, the second control BCS that activates the stronger braking force may not be performed, and only the first control BCF may be used so that the velocity is reduced to the velocity limit or less. In the second embodiment, unlike the first embodiment, there is only one pattern of target location accuracy PC that is required at the target velocity reduction end location Lpi located at the entrance CNI of the curve CN.

FIG. 20 is a diagram illustrating an exemplary data table TBa in which braking force gains Ga are described. The data table TBa is used for the braking control according to the second embodiment. Three braking force gains in total including braking force gains Ga11 to Ga31 are described in the data table TBa. The braking force gain Ga is unambiguously determined once the location measurement accuracy PP is determined.

The braking force gains Ga11, Ga21, Ga31 increase in this order. In other words, the braking force gain Ga is set so that the impact that occurs when the dump truck 2 reduces its velocity is reduced as the location measurement accuracy PP becomes high.

The data table TBa is stored in the storage unit 20M of the vehicle body controller 20 illustrated in FIG. 4. When the vehicle body controller 20 executes the braking control, the control which is the same as that of the first embodiment is executed. A detailed explanation will be omitted.

Although the present embodiment has been described assuming that the velocity is reduced at the entrance CNI of the curve CN, the present embodiment is not limited to this situation. For example, the present embodiment may be applied to a case where the velocity is reduced when entering the intersection IS, and a case where the velocity is reduced just before a place in which the velocity limit is determined such as an easily slipping road surface.

In the first embodiment, the vehicle body controller 20 is configured to calculate the braking force FB based on the braking force gain G in the first control BCF to activate the braking device 2B, and activate, in the second control BCS, the braking force larger than that of the first control BCF. However, the present invention is not limited to this embodiment of the two-level braking control. For example, the braking force FB may be determined so that the stop at the target stop location Lp is achieved only by the first control BCF. In this case, the larger the braking force in the first control BCF is, the higher the stop location accuracy PRp becomes. However, the impact that occurs on the dump truck 2 at the time of the stop is increased. The control start location Ls with respect to the target stop location Lp may be changed in accordance with the braking force. In this case as well, it is preferable that the braking force gain is determined so that the impact that occurs on the dump truck 2 is reduced while the target location accuracy PST is ensured.

In the aforementioned embodiment, the calculation formula for calculating the braking force FB is defined as Formula (1). However, the calculation formula is not limited to Formula (1), and the braking force FB may be calculated by any calculation formula as long as the braking force gain G is contained.

In the aforementioned embodiment, the control system provided in the dump truck 2 is configured to perform the braking control. However, the present invention is not limited to this aspect, and, for example, the braking device may be activated in such a manner that the braking force FB is calculated by the management device 10, and the calculated braking force FB is sent to the dump truck 2 through the communication system 9.

In the aforementioned embodiment, the location measurement accuracy PP and the target location accuracy PST are prepared in advance so as to be divided into the three levels. However, the present invention is not limited to this aspect, and, for example, the braking force gain may be calculated by the quantified location measurement accuracy PP and target location accuracy PST.

In the aforementioned embodiment, when it is judged whether the accuracy of the GPS location is high accuracy, it is judged whether the solution of the GPS location detected by the GPS receiver 31 is the fixed solution. However, the present invention is not limited to this judgement. For example, even when the solution of the GPS location is the float solution, it may be judged that the accuracy of the GPS location is high accuracy as long as a predetermined condition is satisfied.

In the first embodiment and the second embodiment, an exemplary case where the work vehicle is the mining machine that is used in the mine has been described. However, the work vehicle is not limited to the mining machine. The work vehicle only needs to have at least the running device 23 and the braking device 2B. For example, a work vehicle that is used in an underground mine and a work vehicle that is used in a work site on the ground may be employed. The work vehicle is a concept including the mining machine.

In the first embodiment and the second embodiment, the work vehicle is the dump truck 2. However, the work vehicle may be a wheel loader, a grader, or a general vehicle 3C. In the first embodiment and the second embodiment, the dump truck 2 is the unmanned dump truck. However, the dump truck 2 is not limited to this example, and may be configured to assist driving of a manned dump truck.

The method by which the scan matching navigation location output controller 33 obtains the location of the dump truck 2 is also not limited to that of the present embodiment. Any method may be employed as long as it is a method to calculate the current location of the dump truck 2 by comparing the detection result of the obstacle sensor 24 and the map information 37 stored in advance. In the present embodiment, the radar sensor and the laser sensor have been described as the examples of the non-contact sensor 24. However, the non-contact sensor 24 is not limited to these examples, and, for example, a situation around the dump truck 2 may be detected using a stereo camera or a mono camera.

In the aforementioned above embodiment, the location of the work vehicle is detected using the GPS detector. However, the present invention is not limited to this example, and the location of the work vehicle may be able to be detected on the basis of known location information generating units. In particular, since the GNSS cannot be detected in an underground mine, for example, existing location information generating units such as an indoor messaging system (IMES), a pseudo satellite (pseudolite), a radio frequency identifier (RFID), a beacon, a surveying tool, a wireless LAN, an ultra wide band (UWB), and a simultaneous localization and mapping (SLAM), or self-location estimation of the work vehicle using a landmark (mark provided in the vicinity of the running path) may be used.

The first embodiment and the second embodiment can suppress, upon braking the dump truck 2 so that the dump truck 2 has the target velocity at the target location, the reduction in the accuracy that is required for the location of the work vehicle that has reached the target location while suppressing the impact that occurs on the dump truck 2. In particular, since the dump truck 2 that is used in the mine has the large mass, the impact easily occurs on the dump truck 2 at the time of the braking. However, the aforementioned embodiment can suppress the reduction in the accuracy of the location for the stop or the like while suppressing the impact on the dump truck 2. Therefore, the aforementioned embodiment is suitable for the large work vehicle that is used in the mine.

The first embodiment and the second embodiment have been described so far. However, the first embodiment and the second embodiment are not limited by the aforementioned contents. The aforementioned components include what can be easily conceived by a person skilled in the art, what is substantially identical, and what is within so-called scope of equivalence. The aforementioned components can be appropriately combined. At least one of various types of omission, substitution, and modification can be performed for the components in a range not deviating from the gist of the first embodiment and the second embodiment.

REFERENCE SIGNS LIST

1 MANAGEMENT SYSTEM
2 DUMP TRUCK
2B BRAKING DEVICE
2S STEERING DEVICE
2D DRIVE DEVICE
3 MINING MACHINE
20 VEHICLE BODY CONTROLLER
20IF INPUT/OUTPUT UNIT
20M STORAGE UNIT
20P PROCESSING UNIT
20PA JUDGMENT UNIT
20PB BRAKING PARAMETER DETERMINATION UNIT
20PC DEAD RECKONING NAVIGATION LOCATION ESTIMATION UNIT
20PD BRAKING CONTROL UNIT
20PE DRIVE CONTROL UNIT
20PF STEERING CONTROL UNIT
21 VEHICLE BODY
23 RUNNING DEVICE
23B BRAKING DEVICE
23R REAR WHEEL
23F FRONT WHEEL
23M ELECTRIC MOTOR
24 OBSTACLE SENSOR
26 GYRO SENSOR
27 VELOCITY SENSOR
30 WORK VEHICLE CONTROL SYSTEM (CONTROL SYSTEM)
31 GPS RECEIVER
32 RUNNING PATH PRODUCING DEVICE
33 SCAN MATCHING NAVIGATION LOCATION OUTPUT CONTROLLER
BCF FIRST CONTROL
BCS SECOND CONTROL
CN CURVE
d TARGET DISTANCE
FB BRAKING FORCE
G, Ga BRAKING FORCE GAIN
MR MINE
PC TARGET LOCATION ACCURACY
PP LOCATION MEASUREMENT ACCURACY
PRc BRAKING CONTROL ACCURACY
PRp STOP LOCATION ACCURACY
PST TARGET LOCATION ACCURACY
TB, TBa DATA TABLE

The invention claimed is:

1. A work vehicle control system that controls a work vehicle having a braking device, the work vehicle control system comprising:
a first location information device configured to obtain and output first location information of the work vehicle and to have a first measurement accuracy;
a second location information device configured to obtain and output second location information of the work vehicle and to have a second measurement accuracy greater than the first measurement accuracy; and
a vehicle body controller configured to control the braking device by applying a braking force that is determined based on one of the first and second location information, wherein
the vehicle body controller increases the braking force when the braking device is controlled with the second location information device having the second measurement accuracy and decreases the braking force when the braking device is controlled with the first location information device having the first measurement accuracy.

2. The work vehicle control system according to claim 1, wherein
the second location information device includes a GNSS receiver and the first location information device includes a location output controller,
the location output controller is configured to calculate the location information of the work vehicle by scan matching navigation, and
the measurement accuracy of the location information of the work vehicle obtained from the GNSS receiver is higher than from the location output controller.

3. The work vehicle control system according to claim 1, wherein
the second location information device includes a GNSS receiver and the first location information device includes a dead reckoning processor,
the dead reckoning processor is configured to estimate the location information of the work vehicle by dead reckoning navigation, and
the measurement accuracy of the location information of the work vehicle obtained from the GNSS receiver is higher than from the dead reckoning processor.

4. The work vehicle control system according to claim 1, wherein
the second location information device includes a location output controller and the first location information device includes a dead reckoning processor,
the location output controller is configured to calculate the location information of the work vehicle by scan matching navigation, the dead reckoning processor is configured to estimate the location information of the work vehicle by dead reckoning navigation, and the measurement accuracy of the location information of the work vehicle obtained from the location output controller is higher than from the dead reckoning processor.

5. The work vehicle control system according to claim 1, wherein the vehicle body controller determines the braking force so as to reduce an impact that occurs on the work vehicle as the measurement accuracy becomes higher.

6. The work vehicle control system according to claim 5, wherein the vehicle body controller controls the braking device by a first control and a second control executed after the first control, the vehicle body controller causes the braking device to generate the braking force in the first control and the second control respectively, the braking force of the second control is equal to or larger than the braking force of the first control, and the vehicle body controller determines the braking force so as to increase the braking force in the first control as the measurement accuracy becomes higher.

7. The work vehicle control system according to claim 5, wherein the vehicle body controller controls the braking device by only a first control, the vehicle body controller causes the braking device to generate the braking force in the first control, and the vehicle body controller determines the braking force so as to reduce the braking force as the measurement accuracy becomes higher.

8. The work vehicle control system according to claim 1, wherein the vehicle body controller determines the braking force of the braking device based on a target location accuracy required when the work vehicle stops at a stop location.

9. A work vehicle control system that controls a work vehicle having a braking device, the work vehicle control system comprising:

a first target location having a first target location accuracy;

a second target location information having a second target location accuracy greater than the first target location accuracy;

a location information device configured to obtain and output location information of the work vehicle; and a vehicle body controller configured to control the braking device by applying a braking force that is determined based on the location information of the work vehicle obtained from the location information device, wherein the vehicle body controller increases the braking force when the vehicle is at or near the second target location having the second target location accuracy and decreases the braking force when the vehicle is at or near the first target location having the first target location accuracy.

10. The work vehicle control system according to claim 9, wherein the second target location comprises a discharging location for a crusher and the first target location comprises a haul stop location on a haul lane, and the target location accuracy is higher at the discharging location for the crusher at the haul stop location on the haul lane.

11. The work vehicle control system according to claim 9, wherein the second target location comprises a discharging location for a cliff bottom and the first target location comprises a haul stop location on a haul lane, and the target location accuracy is higher at the discharging location for the cliff bottom than at the haul stop location on the haul lane.

12. The work vehicle control system according to claim 9, wherein the second target location comprises a loading location and the first target location comprises a haul stop location on a haul lane, and the target location accuracy is higher at the loading location than at the haul stop location on the haul lane.

13. The work vehicle control system according to claim 9, wherein the vehicle body controller determines the braking force so as to reduce an impact that occurs on the work vehicle as the target location accuracy becomes lower.

14. The work vehicle control system according to claim 13, wherein the vehicle body controller controls the braking device by a first control and a second control executed after the first control, the vehicle body controller causes the braking device to generate the braking force in the first control and the second control respectively, the braking force of the second control is equal to or larger than the braking force of the first control, and the vehicle body controller determines the braking force so as to increase the braking force in the first control as the target location accuracy becomes lower.

15. The work vehicle control system according to claim 13, wherein the vehicle body controller controls the braking device by only a first control, the vehicle body controller causes the braking device to generate the braking force in the first control, and the vehicle body controller determines the braking force so as to reduce the braking force as the target location accuracy becomes lower.

* * * * *